United States Patent
Stumphauzer et al.

(10) Patent No.: US 7,285,583 B2
(45) Date of Patent: Oct. 23, 2007

(54) HYBRID PLASTISOL/HOT MELT COMPOSITIONS

(75) Inventors: William C. Stumphauzer, Elyria, OH (US); Anthony A. Parker, Newtown, PA (US)

(73) Assignee: Liquamelt Licensing LLC, Elyria, OH (US)

( * ) Notice: Subject to any disclaimer, the term of this patent is extended or adjusted under 35 U.S.C. 154(b) by 508 days.

(21) Appl. No.: 10/629,876

(22) Filed: Jul. 29, 2003

(65) Prior Publication Data

US 2004/0029980 A1 Feb. 12, 2004

Related U.S. Application Data

(60) Provisional application No. 60/399,535, filed on Jul. 30, 2002, provisional application No. 60/433,840, filed on Dec. 16, 2002, provisional application No. 60/412,907, filed on Sep. 23, 2002.

(51) Int. Cl.
C08F 263/04 (2006.01)
C08F 265/02 (2006.01)
C08F 255/02 (2006.01)
C08K 5/01 (2006.01)
C08L 93/04 (2006.01)

(52) U.S. Cl. ............ 523/201; 524/231; 524/271; 524/322; 524/445; 524/474; 524/487

(58) Field of Classification Search ........ 524/114, 524/271–272, 274, 445–447, 474–476, 487–489, 524/231, 322; 523/201; 521/73–75
See application file for complete search history.

(56) References Cited

U.S. PATENT DOCUMENTS

| | | | |
|---|---|---|---|
| 3,644,245 A * | 2/1972 | Flanagan et al. ......... 524/262 |
| 4,020,966 A | 5/1977 | Wszolek |
| T969,011 I4 | 4/1978 | Vermeire |
| 4,093,097 A | 6/1978 | Wszolek |
| 4,130,213 A | 12/1978 | Wszolek |
| 4,497,941 A | 2/1985 | Aliani et al. |
| 4,537,805 A | 8/1985 | Lin |
| 4,548,985 A * | 10/1985 | Yazaki et al. ............ 525/65 |
| 4,613,632 A | 9/1986 | Aliani et al. |
| 4,622,357 A | 11/1986 | Tsuchida et al. |
| 4,623,588 A | 11/1986 | Nuwayser et al. |
| 4,820,769 A | 4/1989 | Gaku et al. |
| 4,822,653 A | 4/1989 | Kauffman et al. |
| 4,900,771 A * | 2/1990 | Gerace et al. ............ 524/296 |
| 4,906,497 A | 3/1990 | Hellmann et al. |
| 5,091,454 A | 2/1992 | Arendt |
| 5,120,781 A | 6/1992 | Johnson, Jr. |
| 5,227,445 A | 7/1993 | Berger et al. |
| 5,310,803 A | 5/1994 | Hansen |
| 5,512,625 A | 4/1996 | Butterbach et al. |
| 5,574,084 A * | 11/1996 | Peacock .................. 524/270 |
| 5,627,229 A | 5/1997 | Bunnelle et al. |
| 5,827,393 A | 10/1998 | Kinzelmann et al. |
| 5,840,786 A * | 11/1998 | Beck et al. .............. 523/201 |
| 5,965,645 A * | 10/1999 | Beck et al. .............. 524/197 |
| 6,107,430 A | 8/2000 | Dubois et al. |
| 6,143,818 A * | 11/2000 | Wang et al. ............. 524/528 |
| 6,316,088 B1 | 11/2001 | Ogawa et al. |
| 6,548,579 B2 | 4/2003 | Reski et al. |
| 6,586,483 B2 * | 7/2003 | Kolb et al. .............. 521/91 |
| 6,677,394 B1 * | 1/2004 | Butterbach et al. ....... 524/388 |
| 6,756,450 B2 * | 6/2004 | Marinow ................ 525/333.7 |
| 6,809,147 B1 | 10/2004 | Ohno et al. |
| 2003/0100654 A1 * | 5/2003 | Chheang et al. .......... 524/445 |

FOREIGN PATENT DOCUMENTS

WO WO 01/53389 A1 7/2001
WO WO 02/10235 * 2/2002

\* cited by examiner

*Primary Examiner*—Peter Szekely
(74) *Attorney, Agent, or Firm*—Rankin, Hill, Porter & Clark LLP

(57) ABSTRACT

A multiple component adhesive composition is comprised of a polymeric reinforcing phase component and an adsorbent phase component, both as heterogeneously dispersed particulates in an adsorbed liquid component. The reinforcing phase component is substantially incompatible with the liquid component, the adsorbent phase component is compatible or substantially more compatible with the liquid component than is the reinforcing phase component, and the reinforcing phase and adsorbent phase components are partially compatible with one another. The composition has the rheological characteristics of a liquid dispersion and is capable of forming a molten blend at elevated temperatures that solidifies into a solid adhesive upon cooling. Hot-melt or other liquid compositions may also include nanoparticles at least partially exfoliated as a result of shear mixing.

13 Claims, No Drawings

HYBRID PLASTISOL/HOT MELT COMPOSITIONS

RELATED APPLICATIONS

This application is claiming the benefit, under 35 U.S.C. § 119(e), of the provisional application filed Jul. 30, 2002 under 35 U.S.C. § 111(b), which was granted Ser. No. 60/399,535; the provisional application filed Sep. 23, 2002 under 35 U.S.C. § 111(b), which was granted Ser. No. 60/412,907; and the provisional application filed Dec. 16, 2002 under 35 U.S.C. § 111(b), which was granted Ser. No. 60/433,840. Each of these provisional applications is hereby incorporated by reference in its entirety.

FIELD OF THE INVENTION

The invention relates to adhesive compositions and, more specifically, to a hybrid plastisol/hot melt composition especially suited as an adhesive for packaging and the like.

BACKGROUND OF THE INVENTION

Hot-melt adhesives are adhesives which are solid at room temperature and which are applied to the substrates to be joined in the form of a melt, solidifying on cooling after the substrates have been joined together. In the case of thermoplastic adhesives, this operation can be repeated indefinitely because they do not cross-link. They are essentially based on polymers, such as polyamides, polyesters or polyolefins. These polymers typically determine the properties of the adhesive layer in regard to adhesion, strength and temperature behavior. In order to obtain special properties for specific applications, additives are incorporated, for example tackifiers to increase adhesion, plasticizers to increase flexibility, waxes to shorten the open time or crystallization accelerators to improve morphology.

Hot melt adhesives are used widely in the packaging industry for such applications as case and carton sealing, tray forming and box forming. The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, Mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

It would be advantageous to provide an adhesive composition that was a liquid at room temperature, a hot-melt solution at elevated temperatures, and a solid adhesive upon cooling.

For certain packaging and related applications, it may further be desirable to provide an adhesive that meets as many of the following technical specifications as possible: liquid at room temperature; stable over long periods (at least one year); chlorine free; low volatility; easily pumped by gravity feed to a gear or piston pump; largely unaffected by storage at 140 degrees F.°; low cost; ready to use as received (no mixing); will not "pack out," separate, or change when pumped or pressurized; fuses to become a molten adhesive at elevated temperatures; FDA approved for indirect food contact; has good heat stability at fusion temperature; melt viscosity <10,000 cps; $T_g$ similar to conventional EVA packaging grade hot melts; open molten time of about 7 seconds when applied at 350 degrees F.°; set time after compression between two substrates of about 2 seconds; capable of producing fiber tear adhesion to clay coated printed paperboard; foamable to a 50% density reduction while maintaining other adhesion specifications; and able to be compounded with up to 30 phr filler.

DETAILED DESCRIPTION OF THE PREFERRED EMBODIMENTS

The invention relates to a liquid plastisol/hot melt hybrid adhesive technology that has been developed based on a blend of functionally specific materials. The adhesive is in the form of a liquid dispersion at room temperature, and is stable as a liquid when stored at temperatures of up to approximately 140° F. The liquid adhesive is designed to fuse and melt when the dispersion is exposed to temperatures in excess of 300° F. With adequate mixing, the dispersed ingredients form a soluble, molten "hot-melt" solution, which can be dispensed like other hot melt adhesives onto various substrates for industrial adhesive and packaging applications. Once dispensed, the molten hot melt cools to form a solid adhesive which is capable of producing fiber tear when adhered to common clay coated paper stock.

The hot melt may be thermally stable for periods in excess of five hours at process temperatures, and like other thermoplastic adhesives, it can be remelted, and reused after cooling. The achievement of fiber tear adhesion is strongly dependent on mixing (since there are two polymer components), and on activation temperature. Inadequate mixing will result in cohesive failure of the adhesive. Similarly, the adhesive is preferably molten and mixed at temperatures in excess of 350° F. to activate the chemistry; otherwise, the adhesive may cohesively fail.

The adhesive compositions of the invention are based on blends of materials, each of which is dispersed as particulates within a liquid vehicle. Unique processes for mixing and applying the adhesive compositions have also been developed. The particulates are chosen based on their ability to impart a specific function in the finished adhesive, and on their ability to resist liquid adsorption at storage temperatures. More specifically, it has been discovered that the plastisol/hot melt hybrid of this invention contains a liquid phase, which serves as the vehicle for dispersion of the ingredients; a reinforcing phase, which gives the adhesive the requisite cohesive strength for the end use application; and an adsorbent phase, which prevents exudation of the liquid phase during hot melt processing, during application, and during end-use. The adhesive compositions also preferably include an activator, which activates the chemistry and helps to prevent exudation in the finished product; a thermal stabilizer, which provides thermal stability at process temperatures; and secondary additives (optional) for the purpose of controlling viscosity, cost, set time, foaming, etc.

In a particularly preferred embodiment, the liquid phase is comprised of mineral oil; the reinforcing phase is comprised of either poly(ethylene-co-vinyl acetate), a poly(ethylene-co-vinyl acetate-co-methacrylic acid)terpolymer, a poly(ethylene-co-vinyl acetate-co-maleic anhydride)terpolymer, or a mixture thereof; the adsorbent phase is comprised of poly(propylene-co-maleic anhydride), either alone or mixed with other ingredients such as a polypropylene homopolymer, a tackifier such as a rosin ester of pentaerythritol, or a mixture thereof; the activator is comprised of a dicarboxylic acid such as sebacic acid or dodecanedioic acid; the thermal stabilizer is comprised of a mixture of Irganox 1010 (a hindered phenol), and Irganox PS800 (dilauryl thiodipropionate) from Ciba; and the optional secondary additives are comprised of one or more components, including but not limited to materials such as a clay filler, carbon black, an inorganic or organic pigment, a foaming agent such as azobisdicarbonamide, a foaming agent catalyst such as zinc oxide, or any combination thereof.

In a further preferred embodiment, the ratios of the ingredients are controlled so that the reinforcing phase is in excess of the adsorbent phase. In this way, sufficient cohesive strength is maintained, and liquid exudation is prevented in the finished product.

In yet another embodiment, cohesive strength and stiffness are further enhanced through the incorporation of nanoparticles, where it has been found that the method of mixing these particles is important to the achievement of optimum properties. In one scenario, nanoparticle aggregates are exfoliated in the hot-melt molten state, while in a second scenario, they are pre-exfoliated in the dispersion state. In the first scenario, nanoparticle aggregates are added to the dispersion with little to no change in the dispersion state viscosity. The aggregates are then exfoliated during the melt-processing stage to yield a true nanocomposite adhesive. The advantage of this scenario is that the liquid dispersion can be easily prepared through simple low shear mixing. Also, the resultant dispersion is relatively low in viscosity, and as such is it easily processed as a liquid (i.e., through pumping, pouring, etc.). In the second scenario, the aggregates are purposely pre-exfoliated (either partially or completely) in the dispersion state to yield a mixture with controllable rheological characteristics ranging from those of a liquid to those of a gel—independent of the organic ingredient concentrations. The advantage of this scenario is that the dispersion can be processed in applications where higher viscosities are required (with no change in the chemical composition). However, regardless of which scenario is employed, enhanced physical properties are only achieved when the nanoparticle aggregates are exfoliated in the finished solid adhesive.

The overall ratio of liquid to polymer is also controlled so as to maintain a balance between storage stability, hot melt viscosity, and cohesive strength of the finished product. Generally, higher levels of liquid necessitate the use of higher levels of the adsorbent phase (to prevent exudation), which diminishes the cohesive strength of the adhesive. A minimum level of activator (diacid) may be required to both prevent exudation, and to activate the chemical component of the adhesive. Surprisingly, the activator has no effect in the absence of the adsorbent phase.

It is important to note that in combination, these components act in a surprising synergy to form a liquid plastisol/hot melt hybrid adhesive. The omission of any essential ingredient will result in diminished adhesive performance. Furthermore, the synergy can only be realized with adequate mixing of the materials, and with adequate activation of the chemistry; both of which depend on the method(s) of processing and application.

In general, the liquid phase enables the composition to be packaged as a liquid at room temperature, which is a unique and desirable aspect of this invention. The choice of liquid may be limited by several constraints including cost, compatibility with the adsorbent phase, volatility at both elevated temperatures (during processing) and at end-use temperatures, and acceptability for indirect food contact applications. In one especially preferred embodiment of this invention, mineral oil comprises the liquid phase. However, depending on the application, the liquid phase can be any low volatility liquid compound, as long as it is compatible with the adsorbent phase in the finished formulation. Such liquids can be either reactive (e.g., acrylic, epoxy, isocyanate-based materials, trialkoxysilane and hydrolyzed and/or oligomerized products thereof, acid functional compounds like isostearic acid); or non-reactive (e.g., aliphatic hydrocarbons, hydrocarbon esters of diacids like adipic, sebacic, and phthalic acid, esters of monoacids, esters of natural fatty acids such as methyloleate, glyceroldioleate, vegetable oils such as soy oil, epoxidized soy oil, etc.), or combinations thereof. If the reinforcing phase and the adsorbent phase are of higher polarity, then other liquids could include water, glycerol, ethylene glycol, propylene glycol, and mixtures, etc. If reactive liquids are employed, photo and thermal initiators can be used to crosslink the liquids either during the processing of the finished product, or after thermoforming (in which case a photoinitiator, or higher temperature decomposing thermal initiator could be used to finish the cure).

The reinforcing phase provides the finished adhesive with its mechanical integrity, and as such it must have the ability to fuse, melt, and quickly cool to become a solid after it is applied to a substrate. It has been discovered that polymeric materials such as polyolefins are best suited for this purpose. In a preferred embodiment, a polymeric reinforcing phase preferably exists in the form of discrete particles that are dispersed in the liquid phase at room temperature. It is important that the particles do not adsorb the liquid at temperatures below 140° F. In this way, the stability of the liquid adhesive is maintained both during storage and during shipping.

When the dispersion is heated, the polymeric particles (which will comprise the reinforcing phase in the finished adhesive) fuse with the liquid phase to form a molten blend. The temperature of fusion is dictated by the rheological characteristics of the polymer in the presence of the liquid. These characteristics are controlled by several variables including polymer molecular weight, copolymer composition, solubility with the liquid phase, solubility with the other ingredients, and the composition ratios of all ingredients.

It has been further discovered that in order for the adhesive to have the desired end-use properties, the reinforcing polymer phase should be miscible with both the liquid and adsorbent phases at elevated processing temperatures (i.e., in the fused, molten state). Incompatibility at elevated process temperatures can result in incomplete mixing, exudation of the liquid, and exudation of the other ingredients; all of which can interfere with adhesion to the substrate, and can deter from the end-use performance properties.

Further, it has been surprisingly found that the liquid phase should not be completely compatible with the reinforcing phase upon cooling. Although partial compatibility is acceptable, it is more desirable for the liquid phase to separate from the reinforcing phase upon cooling. This counterintuitive finding stems from the observation that if the liquid is too compatible, the mechanical strength of the resultant adhesive is decreased, the "set time" for the hot melt becomes exceedingly long, and the shelf stability of liquid dispersion is compromised. It is most desirable for the reinforcing phase polymer to be incompatible with the liquid phase at temperatures below 140° F. (to maintain storage stability of the liquid dispersion), and to be compatible with the liquid phase at higher temperatures. The balance between compatibility at elevated temperatures and incompatibility at storage temperatures depends on the solubility of the liquid in the reinforcing phase, which in turn depends on copolymer composition, the choice of polyolefin, the choice of liquid, and the ratio of the ingredients.

In one especially preferred embodiment of this invention, the reinforcing phase is comprised of a poly(ethylene-co-vinyl acetate) polymer (EVA). However, the reinforcing phase could conceivably be any polyolefin copolymer or terpolymer (linear, graft, or block) as long as it meets the criteria described above. Such polymers can include copolymers prepared with monomers of ethylene, butylene, propylene or butadiene, etc; copolymerized with other monomers such as vinyl acetate, methyl acrylate, methyl methacrylate, butyl acrylate, styrene (like Index™ polymers from Dow, and Kraton™ polymers from Shell), maleic anhydride, maleic acid, acrylic acid, methacrylic acid, vinyl methyl ether, glycidyl ethers, trimethylolpropanemonoallylether, vinyl chloride, etc. The reinforcing phase could also be comprised of higher polarity polymers such as polyvinyl alcohol, polyvinyl alcohol copolymers, (polyvinylbutyral, polyvinylformal, ethylene vinyl alcohol, polyamides (nylons), and polyvinylpyrrolidone copolymers. It can be appreciated that acid, alcohol, or anhydride functional polymers can enhance adhesion to multiple substrates, and can also provide the capacity to chemically react with a reactive liquid phase andlor adsorbent phase if so desired.

In addition, thermally activated curing agents can be incorporated to cross-link the reinforcing phase and/or the adsorbent phase so as to further improve the physical properties of the finished adhesive. The thermosetting embodiment of the present invention can be achieved via many conventional chemical pathways (familiar to those skilled in the art), one example of which may include the use of a thermally activated peroxide additive such as t-butylperoxide in combination with an ethylene copolymer as the reinforcing phase. The curing agent could also be chosen so as to not react at the temperatures required for mixing and application, but instead to react in either a post-thermal curing process, in a post UV/visible light activated process, or in a moisture activated curing process step. These embodiments could be further formulated to make useful coatings and sealants for metals, wood, plastic, and the like.

It can be further appreciated that blends of the aforementioned polymers can be employed, where blending can either be accomplished through physical mixing of polymers followed by pulverizing into powder form; or through the polymerization process as would be accomplished in a core-shell emulsion or dispersion polymerization. For example, a core-shell emulsion or dispersion process could be used to produce a core of the desired composition for end-use mechanical properties (like a terpolymer of polyethylene-co-vinylacetate-co-methacrylic acid with a VA content of greater than 15%), and a shell which provides shelf stability when the particles are dispersed in the liquid phase of the invention (like a copolymer of ethylene and vinylacetate where the VA content is less than 9%). The shell could also be comprised of the adsorbent phase for the system (as long as shelf stability can be maintained during the storage of the dispersion).

Although incompatibility between the liquid and the reinforcing phase is a prerequisite for attaining a desirable level of cohesive strength in the finished adhesive, it has been observed that exudation of the liquid from the fused solid leads to interfacial adhesive failure. For example, a fused and molten composition of EVA with mineral oil cools to form a polymer with the requisite toughness, but exudation of the oil upon cooling interferes with the adhesive's ability to form a long lasting interfacial bond with the substrate.

It has been found that like EVA, polypropylene homopolymers and copolymers are capable of fusing with mineral oil to form soluble molten compositions at elevated process temperatures; but unlike EVA, these compositions remain surprisingly compatible upon cooling to temperatures below 140° F. (as evidenced by minimal to no exudation of liquid from the blends after cooling). Although polypropylene and its copolymers are more compatible with the liquid phase than EVA (a positive benefit for minimizing liquid exudation in the finished adhesive), this same attribute deteriorates the resultant cohesive strength, making these polymers poor choices for the reinforcing phase. On the other hand, this same "detrimental" attribute has been employed as an important aspect of the present invention. Namely, when polypropylene and/or its copolymers are melt-blended with EVA and mineral oil, they "adsorb" the oil in the composition, which otherwise would exude from the finished adhesive. In this way, the resultant blend displays the simultaneous characteristics of improved strength (from the reinforcing phase), and minimal exudation (from the adsorbent phase). Thus, in blended form, these components work together in a surprising synergy to provide properties that could not be attained from either component alone.

Hence, this invention makes use of a reinforcing phase that must be accompanied by an adsorbent phase to prevent exudation of liquid from the fused solid adhesive. In order to maintain the cohesive strength of the adhesive, the reinforcing and adsorbent phases must be employed at a ratio where the reinforcing phase is in excess of the adsorbent phase. Otherwise, cohesive strength and interfacial adhesion are compromised. Like the reinforcing phase, the adsorbent phase polymers (or other material) should be initially dispersed as particulates material into the liquid phase, together with the dispersed reinforcing phase polymer. In this way, the adhesive can be stored and processed as a liquid dispersion (a desirable feature of this invention).

The composition of the adsorbent phase is also not limited to polymeric materials. In fact, stearic acid has been shown to adequately perform this function. However, a copolymer of polypropylene with maleic anhydride has been found to be the preferred adsorbent phase material, either alone, or in combination with a polypropylene homopolymer. For example, although stearic acid is capable of preventing exudation, this same attribute results in poor shelf stability at temperatures below 140° F. This is because stearic acid melts and becomes compatible with the mineral oil at a relatively low temperature. Thus, although particulates of stearic acid can remain dispersed in mineral oil at room temperature for indefinite periods, the particulates prematurely gel with the mineral oil at temperatures below 140° F. Surprisingly however, particles of polypropylene and its copolymers do not adsorb the mineral oil at storage temperatures, yet they help to prevent exudation of the liquid from the finished, solid product. These polymers also result in an adhesive composition with a greatly reduced set time, which can be an important attribute for economic reasons. Thus, poly(propylene-co-maleic anhydride) and polypropylene enable the adhesive composition to display good liquid shelf stability, low exudation, and a fast set time.

The choice of adsorbent phase also depends greatly on the choice of liquid (for reasons related to compatibility). In general, the adsorbent phase can be comprised of a polymeric material, a low molecular weight compound, a high surface area inorganic material, or a combination of the three. Polymers can include relatively non-polar materials such as polyolefins (like polypropylene and its copolymers, polyethylene and its copolymers, polystyrene copolymers); or relatively polar polymers like nylon, polycaprolactone, polyvinyl alcohol and its copolymers, etc. Other resinous materials can include higher molecular weight aliphatic hydrocarbon waxes, esters, terpene resins, and rosin esters like pentaerythritol ester of tall oil rosin, etc. Low molecular weight compounds can include materials that are capable of gelling with the liquid phase like the aforementioned stearic acid, or like others including azelaic acid, benzoic acid, stearic acid, citric acid, tartaric acid, biotin, niacin, etc. The adsorbent phase can also include traditional micron-sized inorganic fillers, or high surface area inorganic materials, especially nano materials with surface areas in excess of 30 $m^2/g$, and more preferably 100 $m^2/g$ and higher. Such nano-materials can be surface treated with compounds that further enhance their ability to adsorb the liquid phase. Surface treatments can include organosilanes such as n-octyltriethoxysilane, monoacids like stearic acid, quaternary ammonium compounds, or others.

In cases where the adsorbent phase is organic (polymers or low molecular weight compounds), the upper storage temperature limit of the liquid dispersion appears to be related to the melt temperature of the adsorbent phase material, and to the compatibility of the liquid phase with the molten product. Polypropylene (PP) homopolymer has a higher melt temperature than that of its copolymers, and thus the upper storage temperatures for compositions with a PP adsorbent phase will be the highest. However, acceptable adhesion is only achieved when a PP copolymer is employed, either alone, or in combination with PP homopolymer, where maleic anhydride is the preferred comonomer in the copolymer composition. It is believed that this is in part due to the ability of the maleic anhydride groups to provide reactive functionality, which can facilitate the bonding of the adhesive to the substrate. In addition, better cohesive strength is achieved when the adsorbent and reinforcing phases are partially compatible, and when compared to PP homopolymer, PP copolymers are more compatible with EVA.

In another embodiment, the adsorbent phase material, the liquid phase material, or both in combination can be comprised of components that yield finished materials with excellent release characteristics. Such "release" components have the surprising capacity to prevent exudation (like their adhesion promoting counterparts), while enabling the solid material to be easily peeled away from the substrate over which it is applied. An example of an adsorbent phase material that suits this purpose is N,N'-ethylenebisstearamide, while an example of a liquid phase material includes isostearic acid. Uses for this embodiment can include molded parts, or applications where temporary protective coatings are desired for metals, paper products, wood products, glass products, and others.

In addition to maleated PP, it has been surprisingly found that other compounds can be added to the formulation to both minimize liquid exudation, and to enhance the performance of the adhesive. Although these compounds do not prevent exudation by themselves (i.e., they cannot replace the adsorbent phase polymer), they function synergistically with the adsorbent phase to both deter exudation, and to lower the process temperature required for activation of the adhesive. The preferred "activators" for this invention are chosen from the class of dicarboxylic acid compounds. Other compounds capable of catalyzing the ring opening of maleic anhydride (such as amine containing compounds, water, etc.) could also be employed, either separately, or in combination with the dicarboxylic acid compounds. Such compounds could be aqueous-based, and as such they could be optionally dispersed in the oil phase with appropriate surfactants. Also, dicarboxylic acid compounds could be neutralized and rendered water soluble for dispersion in the oil phase to form water-in-oil emulsions. However, the choice of activator, like the other ingredients, is limited by several constraints including cost, compatibility with the other components, volatility at both elevated temperatures (during processing) and at end-use temperatures, and acceptability for indirect food contact applications. In one preferred embodiment of this invention, dodecanedioic acid comprises the activator. In another preferred embodiment, sebacic acid comprises the activator.

Interestingly, not all acids or mixtures of acids provide the beneficial attributes that are observed with either dodecanedioic acid or sebacic acid. For example, a mixture of dodecanedioic acid, sebacic acid, and undecanedioic acid (commercially available as Corfree™ from duPont) does not provide the synergistic benefit that is observed when either dodecanedioic acid or sebacic acid is used alone. This unpredictable result adds further intrigue to the discovery that the addition of either dodecanedioic acid or sebacic acid results in faster set time, less exudation, better adhesion, and lower temperatures for adhesion activation. Although not wishing to be bound by any single theory, it is believed that the diacids have the ability to react with the comonomer constituents, and thus can both catalyze the ring opening of maleic groups, and can graft onto the polymer. It has also been found that there is an upper limit of diacid beyond which no additional improvements are achieved.

In one preferred embodiment, the diacid compounds are dispersed in the liquid phase together with the other dispersed ingredients. It is important that the diacid particles do not become soluble in the liquid at temperatures below 140° F. In this way, the stability of the liquid adhesive is maintained both during storage and during shipping.

In addition to the aforementioned ingredients, the preferred formulation should also contain a thermal stabilizer so that adequate process stability can be achieved. Two stabilizers that have been found to be adequate for this purpose include Irganox 1010 (a hindered phenol), and Irganox PS800 (dilauryl thiodipropionate) from Ciba. Both are generally used at concentrations of <1% by weight of the polymeric materials in the adhesive composition. It has also been found that fillers such as various clays and talcs can be added to the formula to reduce cost, and to further reduce the set time upon cooling. In addition, tackifiers such as rosin ester derivatives and hydrocarbon-based derivatives can also be added to reduce viscosity at process temperatures, and to improve adhesion to certain substrates. Heat activated blowing agents such as azodicarbonomide and the like may also be used as additives to foam the hot melt for the purpose of reducing density and cost.

In another embodiment, the aforementioned dispersion state ingredients can be further mixed with inorganic nanomaterials such as montmorillonites (aluminum silicates), aluminum oxide and its hydrate forms, titanium dioxide, zinc oxide, iron oxide, etc. Nanoparticles have the added benefit of increasing the modulus, the cohesive strength, and the heat distortion temperature of the finished adhesive. However, such improvements are only realized when the nanoparticles are properly mixed and exfoliated in the finished solid adhesive. In a true nanocomposite, the nanometer-sized platelets have a major influence on the molecular configuration of the polymer chains (since the dimensions of a nanoparticle are on the same scale as the dimensions of a polymer chain). An unperturbed polymer chain has a characteristic radius of gyration that roughly depends on its molecular weight, and bond rotational barriers (stiffness). When conditions are favorable, the polymer can adopt an extended chain configuration as it stretches out and adsorbs onto the nano-surface. This has the effect of raising bond rotational barrier energies, and making the chain stiffer. Consequently, macroscopic properties like modulus, toughness, diffusion, and heat distortion are all affected. In a preferred embodiment, montmorillonite can be exfoliated with the aforementioned dispersion ingredients in any combination to form a nanocomposite adhesive. Aside from having a higher modulus, the nanocomposite also exhibits a higher heat distortion temperature, and improved adhesion at elevated temperatures. The heat distortion temperature increases by as much as 25° F. to 30° F. with as little as 3% to 6% montmorillonite by weight.

In order for all of the aforementioned composition ingredients to perform their intended functions, it has also been discovered that molten-state mixing is critical. For example, even though the composition is capable of providing an adhesive with the requisite properties for paper packaging applications, adhesion does not occur unless the materials are adequately mixed in the molten state. It has been shown that after adequate molten state mixing, the adhesive cools to form a solid, which in turn can be re-melted and used as a traditional hot melt adhesive. As such, the adhesive could be fabricated into solid pellets, which would render it useful with traditional hot melt adhesive equipment if so desired. In addition, solidified pellets or powders of the formulations encompassed by this invention could in themselves be used as formulation additives for traditional, extruded and/or pelletized, hot melt adhesives. As such, traditional hot melts could reap the benefits of improved adhesion as well as enhanced physical properties from exfoliated nanoparticles.

Although the solidified versions of the formulations encompassed by this invention are indeed useful and novel, the liquid nature of this adhesive and its shelf stability are an especially advantageous aspect of the invention. In order to take advantage of this aspect of the invention, it is conceivable that the adsorbent phase and reinforcing phase polymers could be premixed together with the remaining solid ingredients (through melt or solution blending), pulverized, and subsequently dispersed as particulates into a liquid medium. Likewise, a process could be employed that performs both the premixing function, and facilitates the application of the molten, blended adhesive composition directly onto the substrates that are to be adhered. In keeping with this objective, an innovative method has been developed which simultaneously serves to both mix the composition (required for adhesion), and to apply it directly to the packaging substrate. Thus, when this method is employed, the adsorbent phase and reinforcing phase particulates can be added as discrete particles to the liquid phase dispersion (a preferred state of dispersion in the liquid adhesive).

In embodiments where it is desirable to further enhance cohesive strength and stiffness with nanoparticles, it has likewise been found that the method of mixing is critical to the achievement of optimum properties. In one preferred embodiment, nanoparticle aggregates are exfoliated in the hot-melt molten state, while in another embodiment, they are pre-exfoliated in the dispersion state. In the first scenario, nanoparticle aggregates are added to the dispersion with surprisingly little to no change in the dispersion state viscosity. The aggregates are then exfoliated during the melt-processing stage to yield a true nanocomposite adhesive. This method offers a process advantage from the standpoint that nanocomposite materials can be formed from relatively low-viscosity liquid dispersions. Thus, when nanoparticles are incorporated as aggregates, they have little to no effect on viscosity, and no special process equipment is required to pump or mix the liquid dispersions. Instead, partial or complete exfoliation is accomplished later, through high shear mixing during the final application process. In the second scenario, the aggregates are purposely pre-exfoliated (either partially or completely) in the dispersion state to yield controlled rheological characteristics ranging from those of a liquid to those of a gel, independent of the organic ingredient concentrations. Exfoliation (either in the dispersion state or in the molten state) can be achieved through any combination of methods, including those that employ high shear mixing, and/or ultrasound. Regardless of which embodiment is employed, enhanced physical properties are only achieved when the nanoparticle aggregates are exfoliated (either partially or completely) in the finished solid adhesive.

It should be noted that that in addition to the adhesives of the present invention, other polymer solutions and dispersions can also benefit from the processing advantages of incorporating nanoparticles through the unique methods of exfoliation as described above. Some of these polymer dispersions and solutions may include but are not limited to plastisols, caulks, sealants, paints, and coatings.

EXAMPLES

The following materials were used for the examples:
a. Microthene™ FE532 EVA [24937-78-8], 8 to 9% vinyl acetate, melt index=9.5, from Equistar
b. Microthene™ FN519 LDPE [9002-88-4] from Equistar
c. Microthene™ FP800 PP [9003-07-0] from Equistar
d. Microthene™ FN510 LDPE [9002-88-4] from Equistar
e. Microthene™ FN501 LDPE [9002-88-4] from Equistar
f. Microthene™ FA700 HDPE [25087-34-7] from Equistar
g. Epolene E43P maleated polypropylene from Eastman
h. Epolene C16P maleated polyethylene from Eastman
i. Diisononylphthalate (DINP)
j. Dioctylphthalate (DOP)
k. Dibutylphthalate (DBP)
l. Mineral Oil, white heavy [8020-83-5] Aldrich; and both Drakeol 10 & 35 from Penrico
m. Corfree M1 [72162-23-3] mixture of undecanedioic acid (C8), dodecanedioic acid (C9), and sebacic acid (C10); from duPont
n. 1,12-dodecanedicarboxylic acid [821-38-5]
o. Sebacic acid [111-20-6]
p. Stearic acid
q. Irganox 1010 antioxidant from Ciba
r. Irganox PS800 [123-28-4] from Ciba
s. Nicron 302, magnesium silicate powder (talc), 13 micron particle size
t. National Starch hot melt adhesive
u. EQM-PE; maleated polyethylene from Equistar
v. Permalyn 3100; rosin ester of pentaerythritol (Eastman)
w. Piccotac B; mixed hydrocarbon tackifier (Eastman)
x. EQ-EVA; poly(ethylene-co-vinyl acetate), 18% vinyl acetate from Equistar
y. Isostearic Acid [2724-58-5], Emersol 875 from Henkel
z. Omya, 30 micron, calcium carbonate powder
aa. Capa 6501, polycaprolactone from Solvay
bb. Nanomer I-44, surface treated nano-sized montmorillonite (Nanocor)
cc. Elvax 4355, polyethylene-co-vinyl acetate-co-methacrylic acid, 25% VA, 0.7-1.4% MA, M.I.=6 (duPont)

dd. Nucrel 3990, polyethylene-co-methacrylic acid, 9% MA, M.I.=10 (duPont)
ee. Acrawax C, N,N'-ethylenebisstearamide [110-30-5], Lonza Group
ff. EVA-1, Poly(ethylene-co-vinyl acetate), 9% VA, melt index=3.0, from Equistar
gg. EVA-2, Poly(ethylene-co-vinyl acetate), 12% VA, melt index=3.0, from Equistar
hh. EVA-3, Poly(ethylene-co-vinyl acetate), 15% VA, melt index=3.0, from Equistar
ii. PSMA, poly(styrene-co-maleic acid), [65652-36-0], Aldrich catalog #43,527-9
jj. Celogen 754-A, azodicarbonamide with ZnO catalyst [123-77-3], Crompton Corporation
kk. E-C 597A Maleated polypropylene, Honeywell Corporation
ll. A-CX Grade 2440 polypropylene wax, A-C Performance Products, a division of Honeywell Corporation Unless otherwise specified, a common experimental procedure was used for preparing adhesives, for hot melting/mixing, for application of the adhesive to a polymer/clay coated paper substrate, and for adhesion testing. The "liquid form" of the adhesives was prepared by dispersing the solid ingredients into the liquids at room temperature (into 40 ml glass jars with lids). The dispersions were hand mixed with a spatula. An aliquot of the adhesive (1 to 2 grams) was placed onto a 4"×4" piece of aluminum foil. The foil was placed onto a hot plate at a specified temperature, and was allowed to set for one minute. The "hot melt" form of the adhesives were then mixed with a spatula until visual homogeneity was achieved. At this point, one half of a 2 cm×3 cm polymer/clay coated paper coupon (common stock from either a cereal box or beverage package) was dipped into the hot melt solution so that the coated side of the paper (the printed side) was half-covered with the hot melt solution. The coupon was removed and was immediately pressed (with moderate pressure by hand) against one-half of a second coupon of equal size so that the hot melt was sandwiched between the coated paper coupons in lap-shear fashion. Moderate pressure was maintained for 10 seconds, and then the sample was allowed to cool. After cooling to room temperature, and after a specified period of time, the lap shear samples were twisted by hand to force a tearing failure at the bonded interface. Cohesive failure in the paper stock was deemed as a "pass," and any other type of failure was deemed as "fail."

Example 1

This example illustrates the relative adhesion performance and compatibility of several solid/liquid dispersions (Table 1).

TABLE 1

Example 1 formulations

| Sample | Component A | Component B | Component C | Component D |
|---|---|---|---|---|
| 1-1 | 5 g FA700 HDPE | None | 3.5 g DINP | None |
| 1-2 | 5 g FP800 PP | None | 3.9 g DINP | None |
| 1-3 | 5 g FE532 EVA | None | 4 g DINP | None |
| 1-4 | 5 g E43P maleated PP | None | 5 g mineral oil | None |
| 1-5 | 5 g FN-519 LDPE | None | 3 g DINP | None |
| 1-6 | 5 g FE532 EVA | None | 4 g mineral oil | None |
| 1-7 | 4 g FP800 PP | None | 3.2 g mineral oil | None |
| 1-8 | 1.5 g stearic acid | None | 4.2 g mineral oil | None |
| 1-9 | 4 g FP800 PP | None | 3.2 g mineral oil | None |
| 1-10 | 5 g FE532 EVA | None | 4 g DBP | None |
| 1-11 | 5 g E43P maleated PP | None | 5 g DINP | None |
| 1-12 | 5 g FP800 PP | None | None | None |
| 1-13 | 5 g C16P maleated PE | None | 3.6 g mineral oil | None |
| 1-14 | 5 g C16P maleated PE | None | None | None |
| 1-15 | 5 g FA700 HDPE | None | 3.5 g DOP | None |
| 1-16 | 5 g Permalyn 3100 | None | 5 g mineral oil | None |
| 1-17 | 5 g Piccotac B | None | 5 g Mineral oil | None |
| 1-18 | 5 g E43P maleated PP | None | 5 g Isostearic Acid | None |
| 1-19 | 5 g FE532 EVA | None | 5 g Isostearic Acid | None |
| 1-20 | 5 g Acrawax C | None | 5 g mineral oil | None |
| 1-21 | 5 g PSMA | None | 5 g DBP | None |
| 1-22 | 5 g PSMA | None | 5 g mineral oil | none |

The solid/liquid ratio was chosen in each case to insure that the dispersions behaved as liquids at room temperature. The liquid dispersions in Table 1 fused to become molten liquids at elevated temperatures. All samples except for 1-16 and 1-17 gelled to become solid blends upon cooling.

After hot melt mixing at 385° F., adhesion coupons were prepared (as described above), and the remainder of each sample was allowed to cool to room temperature on aluminum foil. The samples were visually inspected for compatibility while mixing, for exudation upon cooling, and for exudation after 24 hours. After cooling, the relative properties were qualitatively evaluated, and paper adhesion was tested as described above. The results are given in Table 2.

TABLE 2

Results of example 1 experiments.

| Sample | Compatibility upon mixing | Exudation upon cooling | Qualitative Polymer Properties | Exudation after 24 hours | Adhesion |
|---|---|---|---|---|---|
| 1-1 | Liquid phase separation | None | Opaque, tough | Slight | Fail |
| 1-2 | Compatible | None | Opaque, weak, waxy | None | Fail |
| 1-3 | Compatible | Slight | Opaque, Tough, elastomeric | Severe | Fail |
| 1-4 | Compatible | None | Opaque, weak, waxy | None | Fail |

TABLE 2-continued

Results of example 1 experiments.

| Sample | Compatibility upon mixing | Exudation upon cooling | Qualitative Polymer Properties | Exudation after 24 hours | Adhesion |
|---|---|---|---|---|---|
| 1-5 | Compatible | Slight | Opaque, tough | Severe | Fail |
| 1-6 | Compatible | Slight | Opaque, tough, elastomeric | Severe | Fail |
| 1-7 | Compatible | None | Opaque, weak, waxy | None | Fail |
| 1-8 | Compatible | None | Wax | None | Fail |
| 1-9 | Compatible | None | Opaque, weak, waxy | None | Fail |
| 1-10 | Compatible | Slight | Opaque, Tough, elastomeric | Severe | Fail |
| 1-11 | Compatible | None | Opaque, weak, waxy | None | Fail |
| 1-12 | N/A | N/A | Opaque, Tough | N/A | Fail |
| 1-13 | Compatible | Slight | Waxy, weak | Severe | Fail |
| 1-14 | N/A | N/A | Opaque, tough | N/A | Pass |
| 1-15 | Liquid phase separation | None | Opaque, tough | None | Fail |
| 1-16 | Compatible | None | Liquid solution | None | Fail |
| 1-17 | Compatible | None | Liquid solution | None | Fail |
| 1-18 | Compatible | None | Opaque, weak, waxy | None | Fail |
| 1-19 | Compatible | Slight | Opaque, tough, elastomeric | Severe | Fail |
| 1-20 | Compatible | None | Opaque, weak, waxy | None | Fail |
| 1-21 | Compatible | None | Semi-rigid, brittle | None | Fail |
| 1-22 | Incompatible | Extreme | Brittle | Extreme | Fail |

It is surprising to note that out of all the polyolefins tested, only the polypropylene homopolymer and the maleated polypropylene copolymer were capable of forming non-exuding solid blends with liquids like mineral oil, isostearic acid, and DINP. Although the solid HDPE/DOP blend is non-exuding, the blend is incompatible when the HDPE is in the molten state. Based on inspection of solubility parameters, it is important to note that these results would not be anticipated by those skilled in the art of making polymer/liquid blends. For example, the solubility parameters in $MPa^{1/2}$ for PE, EVA, and PP range respectively from 15.76 to 17.99 for PE; 17.0 to 18.6 for EVA; and 18.8 to 19.2 for PP. On the other hand, the solubility parameters for paraffinic hydrocarbons (such as those that comprise mineral oil) range from 15 to 18 (see Polymer Handbook, J. Brandrup and E. H. Immergut, Editors, John Wiley and Sons, New York, pp. VII-552-553). Thus, based on the similar differences in solubility parameters between the mineral oil and each polyolefin, there is no reason to suspect that one combination would be more or less compatible than another.

It is also surprising that the PP/DINP blends are free from exudation, whereas EVA/DINP blends are not; especially given that DINP is more polar than mineral oil, and EVA is more polar than PP. It is also of interest that the finished HDPE/DOP blends are compatible, whereas the higher molecular weight DINP shows signs of exudation. Furthermore, unlike the other polyolefins, HDPE appears to be less compatible with the liquid in the molten state. Placing the molten HDPE/DOP and HDPE/DINP blends directly onto adsorbent paper towels served to further verify this visual observation. The paper became immediately saturated with the liquid. Similar tests were also performed with maleated PP/mineral oil blends, but no visual evidence of saturation was observed.

The results in Table 2 also show that with the exception of HDPE/DOP blends, liquid adsorption is accompanied by a qualitative decrease in strength as can be seen by comparing neat PP (1-12) with the liquid/PP blends. Furthermore, although the other polyolefin/liquid blends tend to retain higher levels of toughness and strength, their exudation is extreme. Hence, none of the polymer/liquid blends in this example has the requisite cohesive strength and/or liquid compatibility to produce acceptable adhesion to paper (as judged by the poor adhesion results). Only the neat maleated PE displays adequate adhesion to paper; but when blended with mineral oil, its adhesion decreases, its strength deteriorates, and its liquid component (mineral oil) exudes.

It is also noteworthy that stearic acid, like PP and maleated PP, is capable of adsorbing liquids like mineral oil. However, the resultant low molecular weight gel has even less cohesive strength than the compatible PP/liquid blends, and thus it cannot be used as an adhesive by itself. Acrawax C and PSMA are also capable of adsorbing mineral oil and DBP, respectively, but no adhesion is achieved. Further, the solid tackifiers, Piccotac B and Permalyn 3100, fuse with mineral oil to produce compatible, liquid solutions at room temperature. Needless to say, these liquids have no cohesive strength.

Example 2

This example demonstrates the feasibility of using multiple component liquid dispersions to both minimize exudation and to maintain sufficient cohesive strength in the finished adhesive. The candidates for "Component B" in these formulations are chosen based on their ability to prevent liquid exudation by themselves as shown in Example 1. Note that the "diacid" in this example refers to dodecanedioic acid. The formulations are provided in Table 3.

TABLE 3

Example 2 formulations: multicomponent blends

| Sample | Component A | Component B | Component C | Component D |
|---|---|---|---|---|
| 2-1 | 5 g FE 532 EVA | none | 4.2 g mineral oil | None |
| 2-2 | 5 g FE532 EVA | 2 g stearic acid | 4.2 g mineral oil | None |
| 2-3 | 5 g FE532 EVA | 1.5 g stearic acid | 4.2 g mineral oil | 0.7 g diacid |
| 2-4 | 5 g FA700 HDPE | None | 4.2 g mineral oil | None |
| 2-5 | 5 g FA700 HDPE | 2 g stearic acid | 4.2 g mineral oil | None |
| 2-6 | 5 g FA700 HDPE | none | 4.2 g mineral oil | 2 g diacid |
| 2-7 | 5 g FA700 HDPE | 1.5 g stearic acid | 4.2 g mineral oil | 0.7 g diacid |
| 2-8 | 5 g FN-519 LDPE | None | 4.2 g mineral oil | None |
| 2-9 | 5 g FN-519 LDPE | 2 g stearic acid | 4.2 g mineral oil | None |
| 2-10 | 5 g FN-519 LDPE | none | 4.2 g mineral oil | 2 g diacid |
| 2-11 | 5 g FN-519 LDPE | 1.5 g stearic acid | 4.2 g mineral oil | 0.7 g diacid |
| 2-12 | 5 g FE 532 EVA | 1.5 g FP800 PP | 4.2 g mineral oil | 0.7 g diacid |
| 2-13 | 5 g FE 532 EVA | 1.5 g E43P | 3.8 g mineral oil | 0.7 g diacid |
| 2-14 | 3.5 g FE 532 EVA | 3 g E43P | 3.9 g mineral oil | 0.7 g diacid |
| 2-15 | 3.5 g FE 532 EVA | 3 g E43P | 3.9 g DINP | 0.7 g diacid |
| 2-16 | 3.5 g FP800 PP | 3 g E43P | 3.9 g mineral oil | 0.7 g diacid |
| 2-17 | 3.5 g C16P | 3 g FA700 HDPE | 4 g DOP | none |
| 2-18 | 3.5 g C16P | 3 g FA700 HDPE | 4 g DOP | 0.7 g diacid |
| 2-19 | 3.5 g C16P | 3 g E43P | 3.9 g mineral oil | 0.7 g diacid |
| 2-20 | 3.5 g FE 532 EVA | 3 g FA700 HDPE | 4 g DOP | 0.7 g diacid |
| 2-21 | 3.5 g FE532 EVA | 1.5 g E43P/1.5 g FA700HDPE | 2 g DOP/2 g mineral oil | 0.7 g diacid |
| 2-22 | 3.5 g EQM PE | 3 g E43P | 4 g mineral oil | 0.7 g diacid |
| 2-23 | 4 g EQM PE | 2.5 g E43P | 4.5 g mineral oil | 0.7 g diacid |
| 2-24 | 4 g FE532 EVA | 2.5 g E43P | 4.5 g mineral oil | 0.7 g diacid |
| 2-25 | 2.6 g FE532 EVA | 4 g E43P | 3.5 g mineral oil | 0.7 g diacid |
| 2-26 | 4.5 g FE532 EVA | 2.0 g E43P | 5.0 g mineral oil | 0.7 g sebacic acid |
| 2-27 | 4.5 g FE532 EVA | 2.0 g Permalyn 3100 | 5.0 g mineral oil | 0.7 g sebacic acid |
| 2-28 | 4.5 g FE532 EVA | 1.5 g E43P/0.5 g Permalyn 3100 | 5.0 g mineral oil | 0.7 g sebacic acid |
| 2-29 | 4.5 g FE532 EVA | 1.5 g E43P/0.5 g Piccotac B | 5.0 g mineral oil | 0.7 g sebacic acid |
| 2-30 | 4.0 g FE532 EVA | 2.5 g E43P | 5 g mineral oil | 0.7 g diacid |
| 2-31 | 4.5 g FE532 EVA | 2.0 g E43P | 5.0 g isostearic acid | 0.7 g sebacic acid |
| 2-32 | 4.5 g EQM PE | 2.0 g E43P | 5.0 g mineral oil | 0.7 g diacid |
| 2-33 | 4.5 g EQM PE | 2.0 g E43P | 5.0 g isostearic acid | 0.7 g diacid |
| 2-34 | 4.5 g FE532 EVA | 2.0 g Acrawax C | 5.0 g mineral oil | 0.7 g sebacic acid |
| 2-35 | 5.0 g FE532 EVA | 2.4 g PSMA | 5 g DBP | 0.7 g sebacic acid |

After hot melt mixing at 385° F., adhesion coupons were prepared, and the remainder of each sample was allowed to cool to room temperature on aluminum foil. The samples were visually inspected for exudation upon cooling, and for exudation after 24 hours. Paper adhesion was tested as described above. The results are given in Table 4.

TABLE 4

Performance of example 2 formulations

| Sample | Exudation upon cooling | Exudation after 24 hours | Adhesion Number of Passes out of 5 |
|---|---|---|---|
| 2-1 | High | High | 0 |
| 2-2 | None | Slight | 0 |
| 2-3 | None | None | 5 |
| 2-4 | High | High | 0 |
| 2-5 | None | None | 0 |
| 2-6 | None | Slight | 0 |
| 2-7 | None | None | 0 |
| 2-8 | High | High | 0 |
| 2-9 | None | None | 0 |
| 2-10 | None | Slight | 0 |
| 2-11 | None | None | 0 |
| 2-12 | None | None | 0 |
| 2-13 | None | None | 5 |
| 2-14 | None | None | 5 |
| 2-15 | None | None | 1 |
| 2-16 | None | None | 0 |
| 2-17 | None | None | 0 |
| 2-18 | None | None | 0 |
| 2-19 | None | None | 1 |
| 2-20 | None | None | 0 |
| 2-21 | None | None | 5 |
| 2-22 | None | None | 5 |
| 2-23 | None | None | 3 |
| 2-24 | None | None | 5 |
| 2-25 | None | None | 0 |
| 2-26 | None | None | 5 |
| 2-27 | None | None | 0 |
| 2-28 | None | None | 5 |
| 2-29 | None | None | 5 |

TABLE 4-continued

Performance of example 2 formulations

| Sample | Exudation upon cooling | Exudation after 24 hours | Adhesion Number of Passes out of 5 |
|---|---|---|---|
| 2-30 | None | None | 5 |
| 2-31 | None | None | 0 |
| 2-32 | None | Slight | 5 |
| 2-33 | None | None | 0 |
| 2-34 | None | None | 0 |
| 2-35 | None | None | 0 |

Samples 2-1 to 2-3 show that when stearic acid is blended with EVA, exudation is greatly decreased, but no adhesion is observed. Surprisingly, when a second acid is added (dodecanedioic acid), exudation is further reduced, and adhesion to paper stock is excellent. Samples 2-4 to 2-11 also show that stearic acid prevents exudation of mineral oil from both HDPE and LDPE. Dodecanedioic acid also provides some benefit. However, only the EVA/stearic acid/dodecanedioic acid blend provides adhesion. Thus, the prevention of exudation alone is not enough to insure adhesion. Instead, at least one of the components must have functionality that is capable of bonding with the substrate, either alone or through activation with another additive.

Samples 2-12 to 2-15 make use of polypropylene and maleated polypropylene as alternatives to stearic acid. Like stearic acid, these polymers also prevent exudation of liquids from EVA. Surprisingly however, only maleated polypropylene with mineral oil provides adequate adhesion. Even though exudation is minimal, adhesion does not occur with polypropylene homopolymer (even in the presence of dodecanedioic acid). Also, only partial adhesion is achieved with DINP in place of mineral oil. These results further illustrate that minimizing exudation is in itself not enough to enable adhesion. Instead, the combination of low exudation, polymer functionality, liquid type, and secondary additives are all critical.

Sample 2-20 makes use of HDPE and DOP in place of maleated polypropylene and mineral oil. Based on the results from Example 1, HDPE prevents the exudation of DOP like both stearic acid, and like maleated PP with mineral oil. Interestingly, when HDPE and DOP are blended with EVA, exudation is prevented, but no adhesion occurs. Surprisingly however, when HDPE/DOP and maleated polypropylene/mineral oil are used in combination (sample 20-21), adhesion does occur. Again, this result shows that multicomponent blends can be used in unexpected ways to both prevent exudation, and to improve adhesion.

Samples 2-16 to 2-19 make use of the "adsorbent" polymer/liquid combinations that were discussed in Example 1, but with alternatives to EVA as the primary polymer component. Sample 2-16 makes use of polypropylene blended with maleated polypropylene and mineral oil. Unlike EVA, polypropylene is capable of adsorbing mineral oil (see Example 1). However, the resultant finished adhesive is cohesively weak and waxy, and no adhesion is observed. Thus, it is important that the blend contain a primary polymer component (the "reinforcing phase" as defined in this invention), which by itself, is incompatible with the liquid. In this way, the primary component can provide the adhesive with strength, and the secondary component (i.e., the "adsorbent phase") can adsorb the liquid to prevent exudation. Further illustration of this comes from sample 2-25, which contains an excess of maleated polypropylene as the adsorbent polymer blended with EVA. This blend does not exude, but unlike its sample 2-14 counterpart (with EVA in excess), no adhesion is observed. Instead, this blend is cohesively weak and waxy like sample 2-16.

Sample 2-17 makes use of maleated polyethylene blended with an HDPE adsorbent phase, and DOP. This adhesive qualitatively has moderate cohesive strength, and it exhibits no exudation. However, it also exhibits no adhesion to paper, much like its sample 2-20 counterpart (with EVA instead of maleated polyethylene). Even the addition of dodecanedioic acid (sample 2-18) does not improve adhesion. Again, these results further illustrate that minimizing exudation is in itself not enough to enable adhesion. Instead, the combination of low exudation, polymer functionality, liquid type, and secondary additives may all be important.

When C16P maleated polyethylene is used in place of EVA in blends with maleated polypropylene and mineral oil, exudation is minimal, and there is some evidence of adhesion (sample 2-19). However, the adhesive is cohesively weaker than its EVA/maleated polypropylene/mineral oil counterpart (sample 2-14). On the other hand, when the C16P is substituted with a qualitatively higher melt viscosity and therefore higher molecular weight maleated polyethylene (sample 2-22 and sample 2-32), the resultant paper adhesion is as good as sample 2-14 (with EVA). Thus, it is also important that the reinforcing polymer (the polymer which by itself is incompatible with the liquid) be of sufficient molecular weight to impart cohesive strength to the adhesive.

As stated earlier, the reinforcing polymer must also be present at an adequate level in the overall formulation. For example, samples 2-23 with EQ maleated PE, and 2-24 with EVA, both make use of higher mineral oil levels (a desirable condition for reducing the viscosities of the dispersion and the melt). At higher mineral oil levels, more reinforcing polymer is also required to maintain cohesive strength (as will be shown in a subsequent example). When employed at the same levels, only the EVA has sufficient strength to provide adequate adhesion. Thus, although other reinforcing polymers can be used (such as maleated PE), the preferred ratios of ingredients will vary depending upon the nature of the reinforcing polymer.

Acids other than dodecanedioic acid can also be used to produce adequate adhesion as shown by sample 2-26, which makes use of sebacic acid together with maleated polypropylene as the adsorbent phase. Tackifiers can also be employed to reduce the melt viscosity of the formulation, and to help prevent exudation of the liquid phase. However, when Permalyn 3100 (a pentaerythritol rosin ester "tackifier") is substituted for maleated polypropylene in sample 2-27, no adhesion is observed. Given that Permalyn-3100 is compatible with mineral oil (as shown in Example 1), it is reasonable to assume that it may be a good adsorbent phase candidate for use in blended formulations. As suspected, Permalyn 3100 prevents exudation, but the resultant blend with EVA is surprisingly weak and waxy (unlike formulations made with either stearic acid or maleated PP). Thus, as shown in the preceding examples, compatibility with the liquid carrier alone is not a sufficient condition for choosing a good adsorbent phase material. Surprisingly, however, a small amount of Permalyn 3100 can be incorporated into the formulation if blended with maleated polypropylene as the adsorbent phase (Sample 2-28). Similarly, Piccotac B, a traditional hydrocarbon tackifier for hot melt adhesives, can also be incorporated as a component of the adsorbent phase when blended with maleated PP (sample 2-29).

Tackifier additives are often used in traditional hot melt adhesive applications to achieve lower melt viscosities, and to improve adhesion to certain substrates. For the purposes of this invention, tackifiers like Permalyn 3100 and Piccotac B can be incorporated, but only insofar as the cohesive strength of the resultant adhesive is not unduly compromised.

Samples 2-31 and 2-33 make use of isostearic acid as an alternative liquid phase to mineral oil. As shown in Example 1, isostearic acid is compatible with maleated PP after melt blending. This effect is also manifested in the multi-component blends of this example, where both adhesives exhibit qualitatively moderate cohesive strengths without signs of exudation. Surprisingly however, the adhesives with isostearic acid as the liquid phase do not adhere to paper, unlike their 2-26 and 2-32 mineral oil counterparts (with EVA and maleated polyethylene as the reinforcing phases, respectively). Samples 2-34 and 2-35 are also non-exuding as might be anticipated from the results presented in Example 1. Surprisingly however, these samples do not adhere to paper. Again, these results further illustrate that minimizing exudation is in itself not enough to enable adhesion.

Example 3

This example demonstrates the surprising effect that the adsorbent phase can have on the moderate temperature storage stability of the liquid dispersions. As shown in example 2, certain adsorbent phase candidates are capable of producing finished adhesives that exhibit minimal exudation, and excellent adhesion to paper. However, many of these adsorbent phase candidates tend to negatively impact the storage stability of the liquid dispersions. Surprisingly, however, it has been found that certain adsorbent phase materials do not negatively affect the storage stability; and as such, they define a preferred embodiment of this invention.

The formulations for this example (given in Table 5) were chosen from those that provided both adequate adhesion and minimal exudation as illustrated in Example 2. In addition, several of the ingredients were separately dispersed into mineral oil for testing. The dispersions were placed into a gravity oven set at 122° F. (50° C.) for a period of 24 hours. The samples were then removed and allowed to cool to room temperature. Using a spatula, the viscosities were qualitatively compared to the viscosities of samples that were retained at room temperature. The change in viscosity was qualitatively reported as either "no change," "slight increase," or "gelation." Results are reported in Table 6.

TABLE 5

Liquid dispersions tested for shelf stability at 122° F.

| Sample | Component A | Component B | Component C | Component D |
|---|---|---|---|---|
| 2-1 | 5 g FE 532 EVA | None | 4.2 g mineral oil | None |
| 2-2 | 5 g FE532 EVA | 2 g stearic acid | 4.2 g mineral oil | None |
| 2-3 | 5 g FE532 EVA | 1.5 g stearic acid | 4.2 g mineral oil | 0.7 g diacid |
| 1-8 | None | 1.5 g stearic acid | 4.2 g mineral oil | None |
| 3-1 | None | None | 4.2 g mineral oil | 0.7 g diacid |
| 3-2 | None | 2.5 g E43P | 5 g mineral oil | None |
| 1-4 | None | 5.0 g E43P | 5 g mineral oil | None |
| 2-30 | 4.0 g FE532 EVA | 2.5 g E43P | 5 g mineral oil | 0.7 g diacid |

TABLE 5-continued

Liquid dispersions tested for shelf stability at 122° F.

| Sample | Component A | Component B | Component C | Component D |
|---|---|---|---|---|
| 2-21 | 3.5 g FE532 EVA | 1.5 g E43P/1.5 g FA700 HDPE | 2 g DOP/2 g mineral oil | 0.7 g diacid |
| 3-3 | None | 5 g FA700 HDPE | 3.5 g DOP | None |
| 3-4 | 5 g EQ-EVA | None | 4.2 g mineral oil | None |

TABLE 6

Qualitative viscosity change after exposure to 122° F.

| Sample | Qualitative Viscosity Change |
|---|---|
| 2-1 | Slight increase |
| 2-2 | Gelation |
| 2-3 | Gelation |
| 1-8 | Gelation |
| 3-1 | No change |
| 3-2 | No change |
| 1-4 | Slight increase |
| 2-30 | No change |
| 2-21 | Gelation |
| 3-3 | Gelation |
| 3-4 | Gelation |

The results of Table 6 demonstrate that certain adsorbent phase materials will actually adsorb the liquid phase at moderate temperatures. Liquid dispersions containing such ingredients can still form useful and novel adhesives, but if moderate temperature storage stability is desirable, then the adsorbent phase must remain dispersed until the material is exposed to higher temperatures (as would be done during the processing of the adhesive). The results show that stearic acid leads to low temperature gelation, as does HDPE with DOP. The dicarboxylic acid does not cause gelation, nor does EVA, unless its vinyl acetate content is increased (sample 3-4). The higher vinyl acetate content equates to a lower Tg, less crystallinity, and better adsorption of mineral oil. Thus, when mineral oil is chosen as the liquid carrier, the ethylene copolymer should be chosen so as to minimize its solubility and adsorption so that adequate storage stability can be achieved.

Surprisingly, when formulation 2-30 is exposed to 122° F., its viscosity remains stable, as does maleated PP when it is dispersed alone in mineral oil (3-2). Thus, when exposed to moderate temperatures, the maleated PP does not adsorb significant levels of mineral oil, at least at the concentrations employed in formulation 2-30. In spite of this, and of equal surprise, the maleated PP is able to retain mineral oil when it is melt blended and cooled as shown in Example 1. Also, formulations containing maleated PP exhibit good adhesion and minimal exudation as shown in Example 2 (like sample 2-30).

Although not wishing to be bound by any single theory, it appears that a good adsorbent phase for this application is a crystalline or semicrystalline material that does not adsorb the liquid phase until it is molten. Further, the melt point of the adsorbent phase should be higher than the highest anticipated storage temperature for the liquid dispersion. Unlike maleated PP, stearic acid dissolves and melts in the mineral oil at moderate temperatures. Upon cooling, the stearic acid then phase separates, recrystallizes, and gels with the mineral oil. Although this effect is desirable for achieving adequate adhesion and minimal exudation, if the effect occurs prematurely during end-use storage, the liquid dispersion will prematurely gel.

Upon recrystallization, the adsorbent phase material must also be able to retain the liquid phase. This is indeed the case for both stearic acid and maleated PP with mineral oil, and for HDPE with DOP. However, of the three examples cited here, only the maleated PP displays the unique capability of providing adequate end-use adhesion, and acceptable storage stability.

Example 4

This example demonstrates the effect of mixing (and hence the effect of the application process) on the resultant adhesion. Sample 2-30 was heated on a hot plate at 385° F., and was mixed according to the procedure outlined above. A second sample of the same formulation was heated, but without mixing. Adhesion coupons were prepared in both cases for relative comparison. The mixed sample exhibited fiber tear adhesion 5 out of 5 times, whereas the unmixed sample provided no adhesion. In the absence of mixing, the cohesive strength of the adhesive was significantly reduced. Thus, this example demonstrates a preferred method for applying the adhesive of this invention. The adhesive must either be premixed, or it must be mixed during the application process, otherwise the adhesive will not produce adequate adhesion to the substrate.

Example 5

This example demonstrates the effect of temperature on adhesion in the presence and absence of diacid. It also demonstrates the effect of mixed dicarboxylic acid additives on adhesion. The procedures are the same as those used in Example 2, except samples were processed at temperatures of 345° F., 385° F., and 430° F. Table 7 provides the comparative formulations for this example, and Table 8 provides the results, including exudation upon cooling, exudation after 24 hours, and adhesion to paper. The exudation results were judged for samples that were processed at 385° F., whereas adhesion was judged at all three temperatures.

TABLE 8

Performance of Example 5 formulations

| Sample | Exudation upon cooling | Exudation after 24 hours | Adhesion #Passes out of 5, processed at 345° F./ 385° F./430° F. |
|---|---|---|---|
| 5-1 | None | Slight | 0/0/2 |
| 5-2 | None | None | 5/5/5 |
| 5-3 | None | Slight | 0/0/1 |
| 5-4 | None | None | 5/5/5 |
| 5-5 | None | None | 5/5/5 |
| 5-6 | None | None | 5/5/5 |
| 5-7 | None | None | 5/5/not tested |
| 5-8 | None | None | 5/5/not tested |
| 5-9 | None | Slight | 0/1/0 |

These results show that in the absence of a dicarboxylic acid, exudation occurs, and the resultant adhesion is poor. Also, the addition of a dicarboxylic acid such as dodecanedioic acid or sebacic acid produces acceptable adhesion at significantly reduced process temperatures. Interestingly, the level of the diacid has little effect on the resultant adhesion (at least when used at levels above 0.7 g in these formulations). Thus, the composition should contain preferably between zero and 15% of a dicarboxylic acid "activator" by weight. Surprisingly, a mixture of dicarboxylic acids (e.g. Corfree M1, which contains fractions of both dodecanedioic acid and sebacic acid) does not improve adhesion.

Thus, the preferred adhesive of this invention is comprised of a dicarboxylic acid "activator" additive such as dodecanedioic acid or sebacic acid. These additives not only minimize exudation as shown here and in Example 2, but they also lower the minimum threshold temperature required to achieve adhesion. Hence, the preferred method of application not only involves mixing as shown in Example 4, it involves heating the adhesive to a certain minimum threshold temperature so as to achieve adhesion, where the minimum threshold temperature is affected by the presence or absence of a dicarboxylic acid in the formulation.

Example 6

This example describes the effect of component ratios on viscosity, shelf stability, and adhesion. The formulations listed in Table 9 were made according to procedures outlined in Examples 1 and 2. The level of sebacic acid was kept constant (at 0.7 g) as was the total level of resin (at 6.5 g),

TABLE 7

Formulations for Example 5.

| Sample | Component A | Component B | Component C | Component D |
|---|---|---|---|---|
| 5-1 | 3.5 g FE 532 EVA | 3 g E43P | 4.0 g mineral oil | None |
| 5-2 | 3.5 g FE 532 EVA | 3 g E43P | 4.0 g mineral oil | 0.7 g dodecanedioic acid (diacid) |
| 5-3 | 4.0 g FE532 EVA | 2.5 g E43P | 4.5 g mineral oil | none |
| 5-4 | 4.0 g FE532 EVA | 2.5 g E43P | 4.5 g mineral oil | 0.7 g diacid |
| 5-5 | 4.0 g FE532 EVA | 2.5 g E43P | 4.5 g mineral oil | 1.0 g diacid |
| 5-6 | 4.0 g FE532 EVA | 2.5 g E43P | 4.5 g mineral oil | 1.5 g diacid |
| 5-7 | 4.0 g FE532 EVA | 2.5 g E43P | 4.5 g mineral oil | 0.7 g sebacic acid |
| 5-8 | 4.0 g FE532 EVA | 2.5 g E43P | 5 g mineral oil | 0.7 g diacid |
| 5-9 | 3.5 g FE532 EVA | 3 g E43P | 4.0 g mineral oil | 0.7 g Corfree M1 | while the ratio of adsorbent phase to reinforcing phase was varied, as was the level of liquid. After hot melt mixing at 385° F., adhesion coupons were prepared, and the remainder of each sample was allowed to cool to room temperature on aluminum foil. The samples were visually inspected for exudation after 24 hours, and after 20 days. The samples were qualitatively compared and ranked via a relative numeric scale (1=lowest, 4=highest).

Paper adhesion was tested (as described in Example 2) after 1 day and after 20 days (number of passes out of 5 coupons). Each adhesive (in liquid dispersion form) was also placed in a 65° C. oven for 24 hours to test shelf stability as judged by the relative increase in viscosity. The viscosities were qualitatively compared and ranked via a relative numeric scale (1=lowest, 7=highest). The results are given in Table 10.

TABLE 9

Formulations tested in Example 6

| Sample | FE532 EVA (reinforcing phase) | Maleated PP (adsorbent phase) | Mineral oil (liquid phase) |
|---|---|---|---|
| 6-1 | 4.0 g | 2.5 g | 5.0 g |
| 6-2 | 4.0 g | 2.5 g | 5.5 g |
| 6-3 | 4.0 g | 2.5 g | 6.0 g |
| 6-4 | 4.25 g | 2.25 g | 5.0 g |
| 6-5 | 4.25 g | 2.25 g | 5.5 g |
| 6-6 | 4.25 g | 2.25 g | 6.0 g |
| 6-7 | 4.5 g | 2.0 g | 5.0 g |
| 6-8 | 4.5 g | 2.0 g | 5.5 g |
| 6-9 | 4.5 g | 2.0 g | 6.0 g |

TABLE 10

Relative ranking of exudation, adhesion, and liquid dispersion viscosity

| Sample | Exudation @ 1 day | Exudation @20 days | Adhesion @1 day | Adhesion @ 20 days | Viscosity |
|---|---|---|---|---|---|
| 6-1 | None | 1 | 5 | 5 | 5 |
| 6-2 | None | 1 | 4 | 5 | 3 |
| 6-3 | None | 2 | 5 | 5 | 1 |
| 6-4 | None | 2 | 5 | 5 | 6 |
| 6-5 | None | 3 | 5 | 5 | 4 |
| 6-6 | None | 3 | 5 | 5 | 2 |
| 6-7 | None | 4 | 5 | 4 | 7 |
| 6-8 | None | 3 | 3 | 4 | 5 |
| 6-9 | None | 4 | 3 | 4 | 4 |

Although none of the samples exhibits immediate exudation, the level of exudation generally increases as the level of the adsorbent phase is decreased, and as the level of liquid phase is increased. Similarly, the samples with the best adhesion are those that have higher ratios of the adsorbent phase to the liquid phase (i.e. those that exhibit the lowest levels of exudation).

The viscosities of the dispersions (after exposure to 65° C.) decrease with increasing levels of liquid phase, but they surprisingly decrease with increasing levels of the adsorbent phase. This result is parallel to that reported in Example 3. Even when exposed to elevated temperatures, dispersions with maleated polypropylene adsorb the least amount of mineral oil. In spite of this, and of equal surprise, formulations with the highest levels of maleated PP are able to retain mineral oil when they are melt-blended and cooled. Also, formulations containing maleated PP exhibit good adhesion and minimal exudation.

Example 7

This example demonstrates the use of heat stabilizers and inorganic additives in the adhesive formulations of this invention. The formulations (shown in Table 11) were made according to procedures outlined in Examples 1 and 2. After hot melt mixing at 385° F., adhesion coupons were prepared, and the remainder of each sample was allowed to cool to room temperature on aluminum foil. The samples were visually inspected for exudation after 24 hours. Paper adhesion was tested (as described in Example 2) after 1 day. Each adhesive (in liquid dispersion form) was also placed in a 45° C. oven for 24 hours to test shelf stability as judged by the relative increase in viscosity. The results reported in Table 12 show that the formulations exhibit good adhesion, minimal exudation, and good shelf stability at moderate temperatures.

TABLE 11

Formulations used in Example 7.

| Material | 7-1 (weight % of each component) | 7-2 (weight % of each component) | 7-3 (weight % of each component) |
|---|---|---|---|
| FE 532 EVA | 29.43 | 26.01 | 26.01 |
| Maleated PP | 18.39 | 11.56 | 8.09 |
| Mineral oil | 36.79 | 34.68 | 34.68 |
| Stearic acid | 0.24 | 0 | 0 |
| Sebacic acid | 5.15 | 4.05 | 4.05 |
| Nicron 302 talc | 10.0 | 0 | 0 |
| Omya calcium carbonate | 0 | 23.12 | 23.12 |
| Irganox 1010 | 0 | 0.29 | .29 |
| Irganox PS800 | 0 | 0.29 | .29 |
| Permalyn 3100 | 0 | 0 | 3.47 |

TABLE 12

Results of adhesion, exudation, and shelf stability evaluations of Example 7 formulations.

| Formulation | Exudation at 24 hours | Adhesion (#pass/5) | Viscosity change after 45° C. exposure |
|---|---|---|---|
| 7-1 | None | 5 | No change |
| 7-2 | None | 5 | No change |
| 7-3 | None | 5 | No change |

Example 8

This example demonstrates the effect of the liquid adsorbent phase on the "set time" of the adhesive. The "set time" in this example is defined as the time required for the adhesive to change from a molten liquid to a solid. In all cases, 1.0 g of each formulation was melt-blended at 385° F. according to procedures in Examples 1 and 2. The samples were removed from the hot plate and placed on a bench top at room temperature to cool. The adhesives were visually monitored for the "onset time of set," or the time required for the first sign of crystallization to appear as visually monitored by the appearance of any sign of opacity. The "set time" of the adhesives was recorded as the time required for the entire adhesive to appear opaque. At this point, the adhesive was also observed to be solid as judged by pressing it with a metal spatula. Formulations for this example are provided in Table 13, and results are presented in Table 14.

TABLE 13

Formulations used in Example 8.

| Sample | FE532 EVA | Maleated PP | Stearic Acid | Dodecanedioic acid | Mineral oil | Commercial Hot Melt (National Starch) |
|---|---|---|---|---|---|---|
| 8-1 | 0 | 0 | 0 | 0 | 0 | 100% |
| 8-2 | 5 g | 0 | 1.5 g | 0.7 g | 4.2 g | 0 |
| 8-3 | 4 g | 2.5 g | 0 | 0 | 4.5 g | 0 |
| 8-4 | 4 g | 2.5 g | 0 | 0.7 g | 4.5 g | 0 |
| 8-5 | 4 g | 2.5 g | 0 | 1.0 g | 4.5 g | 0 |
| 8-6 | 4 g | 2.5 g | 0 | 1.5 g | 4.5 g | 0 |
| 8-7 | 3.5 g | 3 g | 0 | 1.0 g | 4.0 g | 0 |

TABLE 14

Effect of Formulations on the relative "onset time of set" and on the "set time."

| Sample | Onset time of set (seconds) | Set time (seconds) |
|---|---|---|
| 8-1 | 15 | 55 |
| 8-2 | 14 | 45 |
| 8-3 | 10 | 35 |
| 8-4 | 10 | 35 |
| 8-5 | 10 | 40 |
| 8-6 | 5 | 40 |
| 8-7 | 5 | 35 |

In spite of being formulated with low molecular weight mineral oil, even the sample with stearic acid as the adsorbent phase exhibits faster set than the comparative commercial adhesive. The set time is observed to slightly decrease as the dodecanedioic acid level is increased, but the decrease in set time is most dramatic as the ratio of maleated PP to mineral oil is increased. This example shows that the set time of the formulations of this invention can be controlled by varying the compositions, and that set times can be achieved which are on par with those of traditional hot melt adhesives.

Example 9

This example demonstrates the effect of the reinforcing phase copolymer composition on adhesive performance. In example 3, an ethylene copolymer with a higher level of vinyl acetate of 18% VA (sample 3-4) was shown to have worse shelf stability than a copolymer with 9% VA when the polymer particles were dispersed in mineral oil. However, a higher vinyl acetate level, particularly when copolymerized with an additional monomer such as methacrylic acid, or maleic anhydride, can yield a particularly useful polymer for the purposes of this invention. Because of the detrimental effect on shelf stability, polymer particles of this type should be protected with a coating layer of a polymer that is not permeated by the liquid phase until the temperature is raised beyond some critical level. In this way, the core of the particle would not be permeated prematurely by liquid, and the dispersion would be shelf stable. Such a coating could be for example, an ethylene copolymer with a lower vinyl acetate content, a copolymer of ethylene and methacrylic acid, a polysiloxane, polyethylene, polypropylene, a polypropylene copolymer, or others.

In anticipation that such a coating could be developed (core-shell polymerization technology is well known in the art), the potential "core" of this hypothetical particle was evaluated by making use of commercially available ethylene copolymers in pelletized form. Such copolymers could conceivably be pulverized and subsequently coated, or a different polymerization process could be employed to produce core particles with non-permeable shells. For the purposes of this evaluation, the pelletized copolymers, Elvax 4355, and Nucrel 3990, were used as received, and were melt blended into formulations via procedures outlined in examples 1 and 2. In order to test the potential shelf stability (if they were to exist as small particle particulates), the polymer pellets were placed into separate glass vials at a 1/1-weight ratio of mineral oil to polymer. The vials were placed into an oven set at 50° C., and were removed after overnight exposure. The samples were allowed to cool to room temperature, and were then evaluated for gelation. The Elvax 4355 pellets (25% VA, 0.7 to 1.4% MA) were completely gelled with one another, whereas the Nucrel 3990 (9% MA) pellets were still free flowing. This result was consistent with earlier observations that showed the detrimental effect of higher vinyl acetate levels on shelf storage stability.

Formulations were prepared with 4.5 g of each pelletized polymer, 2.0 g of E43P maleated polypropylene, 0.7 g sebacic acid, and 4 g of mineral oil. Table 15 shows the results for paper adhesion, and 24-hour exudation evaluations for the two comparative formulations.

TABLE 15

Comparative paper adhesion and exudation of formulations made with Nucrel 3990 and Elvax 4355.

| Formulation | Paper Adhesion (#pass/5) | 24 hour exudation |
|---|---|---|
| 9-1 (Elvax 4355) | 5/5 | none |
| 9-2 (Nucrel 3990) | 1/5 | slight |

These data show that high VA content ethylene copolymers produce good finished adhesives, whereas ethylene copolymers with little to no vinyl acetate content yield poor results with mineral oil as the liquid phase. On the other hand, the shelf stability in a mineral oil liquid phase becomes increasingly better with lower vinyl acetate levels. Thus, in combination with the data of previous examples, this example shows that desirable end-use properties (with a mineral oil liquid phase) can only be achieved when the VA content of the reinforcing phase copolymer is greater than zero, and less than 18% (see example 3). In the absence of VA, poor properties are observed, and when the VA content is too high, shelf stability suffers. In cases where higher vinyl acetate copolymers are desired for their good adhesive attributes, such particles should be coated with non-adsorbing polymers like polyethylene-co-methacrylic acid (i.e., something like the Nucrel 3990 of this example).

Example 10

This example demonstrates the possibility of using a different adsorbent phase (polycaprolactone) and a different liquid phase (dibutylphthalate) to produce a shelf-stable liquid dispersion that could be fused to form a non-exuding, solid product. Unlike formulations prepared with polypropylene-co-maleic anhydride and mineral oil, the formulations in this example were found to exhibit low levels of adhesion to paper. However, the results still demonstrate the broad scope of the invention: namely, stable, non-exuding solids can be fused from liquid dispersions when the appropriate adsorbent phase and liquid phase are chosen.

The efficiency of polycaprolactone (Capa 6501) as an adsorbent phase was first tested by melt blending it with various potential liquid phase materials (at a 1/1-weight ratio) including methyloleate, glyceroldioleate, epoxidized soy oil, mineral oil, and dibutylphthalate. Each mixture was melt-blended at 385° F., and was then allowed to cool on aluminum foil at room temperature. Exudation was monitored after 24 hours. Out of the five liquids tested, only the Capa 6501/DBP blend showed no exudation. Next, a formulation was prepared with 3.5 g FE532 EVA, 3.0 g Capa 6501, 0.7 g sebacic acid, and 4.5 g DBP. A similar formulation was prepared using 4 g FE532 EVA, 2.5 g Capa 6501, 0.7 g sebacic acid, and 4.5 g DBP. Unlike analogous formulations prepared with E43P and phthalate esters, the finished adhesives with Capa/DBP produced no exudation. However, they were cohesively weaker (qualitatively). Also, unlike E43/mineral oil formulations, the Capa/DBP formulations did not adhere to paper stock.

Although the adhesion properties of these formulations were comparatively worse than those of analogous E43P and mineral oil formulations, this example nevertheless shows that alternative adsorbent/liquid phases can be employed to produce fusible solids with low exudation. In this particular case, Capa prevents exudation of DBP which otherwise exudes from EVA (see example 1, sample 1-10). Thus, it is conceivable that a variety of liquids could be employed as long as an appropriate adsorbent phase is identified. Furthermore, physical properties could be improved by using a liquid and/or polymer with reactive functionality (together with appropriate catalysts).

As a final note, this example also serves to further demonstrate the surprising uniqueness of E43P/mineral oil formulations. Namely, even though both Capa/DBP and E43P/mineral oil formulations do not exude, only the E43P/mineral oil formulations provide excellent adhesion to paper stock. Thus, minimal exudation is not in itself a guarantee of good adhesion.

Example 11

This example demonstrates the effect of nanoparticles on the heat distortion temperature, as judged by the upper temperature for cohesive failure of paper stock, and the relative adhesive stiffness. The example also demonstrates the sensitivity of end-use performance to the method by which the mixture is processed. The formulations for this example were melt blended with a spatula over a hot plate for 1 minute at 385° F., and were then tested for both exudation and paper adhesion (via methods and procedures outlined in prior examples). Paper adhesion was also evaluated at elevated temperatures by allowing coupons to equilibrate for 30 minutes in an oven at various preset temperatures prior to tear testing.

The nanoparticle material for this example was Nanomer I-44 montmorillonite from Nanocor. The nanoparticles were incorporated in one of two ways: they were either directly added to the formulation (in their aggregated form as-received); or they were pre-blended to form a mineral oil/nanoparticle concentrate, which was then subsequently diluted into the formulation at the appropriate level. Mineral oil/nanoparticle concentrates were prepared by blending 70/30 ratios of oil to powder in a small Hobart mixer. Simple stirring of the 70/30 mixture produced a low viscosity slurry. However, high intensity blending with the Hobart mixer provided the shear required to at least partially exfoliate the aggregated particles, as evidenced by the formation of a high viscosity gel. This gel was then diluted into the finished formulation with simple low shear stirring (using a hand held spatula) to produce a pourable liquid dispersion with the desired level of Nanomer I-44.

Qualitative comparisons of formulations prepared by direct addition of nanoparticles vs. those prepared with the addition of a premixed concentrate showed that little to no improvement in stiffness or upper adhesion temperature was achieved through direct addition. Property improvements were only achieved when premixed concentrate was employed. This result shows that sufficient shear is required to exfoliate the particles so that end use property improvements can be realized. Thus, the end-use performance of these adhesives is surprisingly sensitive to the process by which they are made.

Table 16 shows four comparative formulations, and Tables 17 and 18 respectively show the results of paper tear adhesion evaluations vs. temperature (# pass out of 6), and the relative stiffness of each sample at room temperature (1=low, 4=high).

TABLE 16

Nanoparticle formulations for example 11.

| Ingredient | 11-1 | 11-2 | 11-3 | 11-4 |
|---|---|---|---|---|
| FE532 EVA | 4.5 | 4.5 | 4.5 | 4.5 |
| E43P | 2.0 | 2.0 | 2.0 | 1.8 |
| Sebacic acid | 0.6 | 0.6 | 0.6 | 0.6 |
| Drakeol 10 mineral oil | 4.4 | 5.4 | 4.4 | 4.4 |
| Nanomer I-44 (direct addition) | 0 | 0.45 | 0 | 0 |
| 70/30 mineral oil/Nanomer I-44 concentrate | 0 | 0 | 1.5 | 1.0 |

TABLE 17

Paper tear adhesion vs. temperature of nanoparticle formulations

| Temperature for Paper tear adhesion test (° F.) | 11-1 | 11-2 | 11-3 | 11-4 |
|---|---|---|---|---|
| 70 | 6/6 | 6/6 | 6/6 | 6/6 |
| 110 | 6/6 | 6/6 | 6/6 | 6/6 |
| 120 | 6/6 | 6/6 | 6/6 | 6/6 |
| 130 | 3/6 | 3/6 | 6/6 | 6/6 |
| 135 | 3/6 | 3/6 | 6/6 | 6/6 |
| 140 | 3/6 | 3/6 | 3/6 | 3/6 |

TABLE 18

Relative stiffness (at room temperature) of nanoparticle formulations.

| Formulation | Relative Stiffness (1 = low, 4 = high) |
|---|---|
| 11-1 | 1 |
| 11-2 | 2 |
| 11-3 | 3 |
| 11-4 | 4 |

These results show that when properly exfoliated, the nanoparticles increase both the stiffness of the adhesive, and the upper temperature limit for achieving cohesive paper tear. Even though the adjusted mineral oil level is the same for 11-2 and 11-3, the properties are only improved when the exfoliated concentrate is employed. Also, the control (11-1)

exhibits worse properties than 11-3 in spite of 11-3's higher mineral oil level. Example 6 showed that higher mineral oil levels generally result in worse properties. However, this example shows that nanoparticles can improve material properties enough to compensate for the elevated level of mineral oil. Thus, in addition to all of its other benefits, this invention provides a method by which nanoparticles can be exfoliated and subsequently incorporated into fusible liquid formulations to produce adhesives with substantial property improvements.

Example 12

This example further demonstrates the sensitivity of end-use performance to the method by which the nanocomposites are processed. The formulations for this example were melt blended with a spatula over a hot plate at 385° F. for a specified time, and were then tested for both exudation and paper adhesion (via methods and procedures outlined in prior examples). Paper adhesion was also evaluated at elevated temperatures by allowing coupons to equilibrate for 30 minutes in an oven at various preset temperatures prior to tear testing.

The nanoparticle material for this example was Nanomer I-44 montmorillonite from Nanocor. The nanoparticles were incorporated in one of two ways. In sample 12-1, they were directly added "as-received" to the formulation (in their aggregated form). For the case of sample 12-2, mineral oil/nanoparticle concentrates were first prepared by blending 70/30 ratios of oil to powder in a small Hobart mixer. As noted in Example 11, simple stirring of the 70/30 mixture produced a low viscosity slurry. High intensity blending with the Hobart mixer provided the shear required to exfoliate the aggregated particles, as evidenced by the formation of a high viscosity gel. Using simple low shear stirring (with a hand held spatula), the concentrated gel was then diluted into neat mineral oil (minus the other ingredients). The resultant low viscosity dispersion of Nanomer I-44 in oil was then exposed to an ultrasound bath for one hour in an attempt to further exfoliate the nanoparticles. Upon removal from the ultrasound bath, the Nanomer I-44/oil mixture was observed to be a translucent gel, indicative of a higher degree of exfoliation than was achieved with a similar sample, 11-3. At this point, the remainder of the formulation ingredients was added to yield a gelled version of the adhesive, with otherwise the same composition as sample 12-1. Thus, the dispersions differed only in the methods used to prepare them. The ingredients in both 12-1 and 12-2 were as follows: FE 532 EVA, 4.5 g (35.9%), E43P, 2.0 g (16.0%), Sebacic acid, 0.7 g (5.6%), Mineral oil, 5.0 g (39.9%), and Nanomer I-44, 0.32 g (2.6%).

Samples 12-1 and 12-2 were hot plate blended for one minute at 385° F. (with the usual one minute pre-heat period). In addition, a second aliquot of sample 12-1 was hot plate blended (with rigorous stirring) until the degree of translucency was qualitatively equivalent to the translucency of sample 12-2 (approximately five minutes of mixing time was required). Thus, the hot-melts differed only in the time and shear applied during blending. Table 19 provides a summary of the comparisons. Table 20 compares the adhesion results at room temperature and at a substrate temperature of 140° F.

TABLE 19

Comparison of methods used to process Nanomer I-44 in comparative samples from Example 12.

| Sample | Method of dispersion state mixing | Qualitative evaluation of dispersion | Method of hotmelt blending |
|---|---|---|---|
| 12-1A | Direct addition; low shear mixing | Low viscosity liquid dispersion | 1 minute of shear, 385° F. |
| 12-1B | Direct addition; low shear mixing | Low viscosity liquid dispersion | 5+ minute of shear at 385° F. to achieve improved translucency |
| 12-2 | Addition of 70/30 exfoliated concentrate to oil only; low shear mixing; ultrasound; remainder of ingredients added with low shear | High viscosity Gel | 1 minute of shear, 385° F. |

TABLE 20

Paper tear adhesion results at room temperature and at a substrate temperature of 140° F. (# Pass out of 5).

| Sample | 70° F. | 140° F. |
|---|---|---|
| 12-1A | 5/5 | 2/5 |
| 12-1B | 5/5 | 5/5 |
| 12-2 | 5/5 | 5/5 |

These results show that elevated temperature adhesion characteristics are improved as the degree of exfoliation increases. These results also demonstrate the unique viscosity control feature of this invention. Namely, dispersions with otherwise identical compositions can be made with rheological characteristics ranging from those of a liquid (the aggregate-dispersion form of the invention) to those of a high viscosity gel or paste (the pre-exfoliated form of the invention). Hence, there is a great deal of latitude for process control. For example, a gel or paste could be useful in a continuous application process where it is important to maintain a bond-line during the working period between an adhesive's application, and its final "cure." A gel or paste could also be useful in a caulking application where a continuous bead is to be applied, and then heated to achieve final fusion. At the other extreme, the aggregate dispersion form of this invention enables the use of simple processing equipment for low viscosity liquids. Subsequent shear can then be applied during the stage of molten hot-melt mixing to achieve adequate exfoliation, together with adequate mixing of the reinforcing and adsorbent phases of the dispersion. Also, any intermediate stage (i.e., partial pre-exfoliation) could also be useful, as was accomplished with sample 11-3 in Example 11.

In yet another aspect of this invention, the nanoparticle aggregates could be added directly to any hot melt-adhesive formulation (either the conventional solid-types or the novel hybrid types of this invention) with the objective of post-poning the exfoliation step until the pellets or liquids are subjected to the final process of application to a packaging substrate. In this way, the process costs associated with pre-exfoliation could be minimized, and the benefits of nanocomposite enhancement could be achieved by subjecting the adhesives to sufficient shear during the process of applying the adhesive to a substrate.

Example 13

Formulations were made for the purpose of determining the effect of reinforcing phase molecular weight and vinyl acetate level on adhesion. All formulations were prepared with 4.5 g of the reinforcing phase polymer, 2.0 g E43P adsorbent phase, 0.7 g sebacic acid activator, and 5.0 g mineral oil. The procedures for mixing were the same as those reported in Examples 1 and 2. Paper tear coupons were also made as described in prior examples. Paper tear adhesion was tested as a function of substrate temperature using the procedures as outlined in Examples 11 and 12. Comparative polymers for this example are listed in Table 21. The results of paper tear adhesion vs. temperature are provided in Table 22.

TABLE 21

Comparative poly(ethylene-co-vinyl acetate) reinforcing phase polymers for Example 13 formulations.

| Sample | Polymer | Melt Index | % VA |
|---|---|---|---|
| 13-1 | EVA-1 | 3 | 9 |
| 13-2 | EVA-2 | 3 | 12 |
| 13-3 | EVA-3 | 3 | 15 |
| 13-4 | FE532 EVA | 9.5 | 9 |

TABLE 22

Paper tear adhesion vs. temperature for Example 13 formulations (percentage of passing samples out of out of eight).

| Temperature for Paper tear adhesion test (° F.) | 13-1 | 13-2 | 13-3 | 13-4 |
|---|---|---|---|---|
| 72 | 100 | 100 | 100 | 100 |
| 120 | 100 | 100 | 100 | 100 |
| 130 | 100 | 75 | 75 | 100 |
| 140 | 100 | 50 | 0 | 50 |
| 150 | 75 | 0 | 0 | 0 |

These results illustrate several important aspects of this invention. First, an increase in the molecular weight of the reinforcing phase (compare samples 13-1 and 13-4) leads to improved adhesion at elevated temperatures. Thus, the preferred molecular weight of the reinforcing phase will depend on the desired end-use temperature range, as well as the desired melt-process characteristics (the viscosity of the molten state will increase with increasing molecular weight). Secondly, an increase in the VA % at an otherwise constant molecular weight leads to a decrease in the upper adhesion temperature. Thus, the preferred VA content will also depend on the desired end-use temperature range, as well as the desired melt-process characteristics (the viscosity of the molten state will generally decrease with increasing VA content). As shown in prior examples, the upper VA limit is also dependent on the desired storage temperature characteristics for the liquid dispersion (higher VA level leads to a lower storage temperature limit for reasons related to gelation). It can also be appreciated from prior examples that the heat distortion temperature and hence the upper temperature adhesion threshold can be increased through the incorporation of nanoparticles—independent of molecular weight and VA content. Thus, when taken in combination, the embodiments of this invention provide the capability to produce adhesives with a wide range of processing and end-use characteristics.

Example 14

Formulations were prepared for the purpose of illustrating the utility of an adsorbent phase comprised of a blend of polypropylene homopolymer and maleated polypropylene. The results of show that little to no adhesion is achieved when the adsorbent phase is comprised of polypropylene homopolymer. However, when maleated PP is blended with PP to form the adsorbent phase, acceptable adhesion is achieved. This result shows that the preferred adhesive is one where the adsorbent phase is comprised of maleated PP, or PP blended with maleated PP. The formulations for this example were made and tested in accordance with the aforementioned procedures. The formulations and results are provided in Table 23.

TABLE 23

Ingredients, paper tear adhesion results, and visual exudation evaluations for Example 14 formulations.

| | 14-1 | 14-2 | 14-3 |
|---|---|---|---|
| Equistar FE 532 EVA | 4.5 | 4.5 | 4.5 |
| Honeywell E-C 597 A Maleated PP | 2.0 | 0 | 0.6 |
| A-CX Grade 2440 Polypropylene Wax | 0 | 2.0 | 1.4 |
| Sebacic Acid | 0.7 | 0.7 | 0.7 |
| Mineral Oil | 5.0 | 5.0 | 5.0 |
| Paper tear adhesion (# pass out of five coupons) | 5 | 2 | 5 |
| Exudation (after three days) | None | Partial | None |

Example 15

The purpose of this example is to demonstrate that density reduction can be achieved through the incorporation of foaming agents. When hot-melt adhesives are dispensed as a cellular foam, they provide significant economical advantages by decreasing the mass of adhesive required to obtain any given adhesive bead volume or dimension. For example, adding 30% gas by volume to a given hot-melt will decrease its mass by the same amount; therefore decreasing the cost per bead by the same amount.

Since conventional hot-melts are manufactured and processed at temperatures above the decomposition temperatures of many chemical-blowing agents, it is not possible to use foaming agents to achieve a cellular foamed structure. Instead, a relatively costly process modification is required, whereby gas is mechanically added to the molten hot-melt, and is then dissolved into the molten liquid while under pressure. When the adhesive is dispensed to atmospheric pressure, the solvated gas expands to create a hot-melt foam. Nordson Corporation of Amherst, Ohio offers equipment for this purpose.

The liquid plastisol nature of the present invention facilitates foaming without the use of expensive equipment modifications. Thus, process and material costs can be readily achieved. In order to illustrate this, formulation 15-1 in Table 24 was mixed by hand to form stable liquid plastisol at room temperature.

TABLE 24

Example 15 formulation 15-1.

| Ingredient | Parts by weight |
|---|---|
| Equistar FE 532-EVA | 4.5 |
| Eastman E43P Maleated PP | 2.0 |
| Sebacic Acid | 0.7 |
| Celogen 754 A (blowing agent with catalyst) | 0.09 |
| Mineral Oil (Penrico D35) | 5.0 |

Formulation 15-1 was pumped under pressure from its ambient container through a heat exchanger to elevate its temperature to 350° F. The liquid became molten as it passed through the heater. Viscous drag in the heater provided adequate shear for mixing the polymer blend to form a homogeneous melt. Simultaneously, the chemical blowing agent decomposed to liberate nitrogen gas into the molten adhesive. The gas remained solvated at a pressure of 300 psi.

Solvation of the gas was audibly detected as the molten liquid was dispensed to atmospheric pressure. When the gas was incompletely solvated, audible crackling and hissing sounds were observed to emanate from the dispensing nozzle tip. Crackling sounds were readily observed at 100 psi, and the audible level was observed to gradually decrease until no sound could be heard at 300 psi. When dispensed at 300 psi, the extruded material was observed to expand to form a closed cell foam. At 100 psi, the formulation did not foam, and at 150 psi, the cellular foam structure started to appear with relatively large combinations of open and closed cells. The cell structure was observed to become finer and predominantly closed-cell in nature as the pressure approached 300 psi. At pressures of 300 psi and higher, the resulting extrudate produced a fine, closed-cell foam.

When compared to an equivalent formulation without the foaming agent, the resultant 15-1 extrudate provided a density reduction of approximately 49%. In addition, the foamed hot-melt adhesive provided excellent paper-tear adhesion.

In accordance with the provisions of the patent statutes, the invention has been described in what is considered to represent its preferred embodiments. However, it should be noted that the invention can be practiced otherwise than as specifically illustrated and described without departing from its spirit or scope.

For example, aside from providing a novel adhesive for paper, the invention described herein provides for many additional potential uses. These uses include, but are not limited to, adhesives for other materials; caulking materials; sealants; gaskets; encapsulants to facilitate controlled release of natural and synthetic products in applications ranging from agricultural to medical applications; low adhesion strippable protective coatings for metals and wires (as such they could be formulated with corrosion inhibitors); textile coatings; thermoset coatings for applications demanding abrasion resistance such as floor tiles, wood, and furniture; wear layers for flexible sheet flooring; chemically embossable foamed layers for flexible sheet flooring; safety glass interlayers and solar cell encapsulants; injection molded parts for toys; components for consumer goods; components for industrial and automotive applications; components for construction applications, plumbing applications, electrical applications; and others. In addition, both release and adhering embodiments of this invention could be formulated to serve as barrier coatings for civil and military defense applications.

The invention claimed is:

1. A multiple component liquid plastisol/hot melt hybrid adhesive composition comprised of a reinforcing phase component and an adsorbent phase component, both as heterogeneously dispersed particulates within a liquid component, wherein the reinforcing phase component is substantially incompatible with the liquid component, the adsorbent phase component is compatible or substantially more compatible with the liquid component than is the reinforcing phase component, and the reinforcing phase and adsorbent phase components are partially compatible with one another, the composition being chlorine free and having the rheological characteristics of a liquid dispersion at room temperature and being capable of forming a molten blend at elevated temperatures that solidifies into a non-exuding solid adhesive upon cooling, wherein the dispersed particulates are comprised of a core surrounded by a shell, the core being comprised of substantially the same matter as that which comprises the reinforcing phase component in the fused, solid adhesive, and the shell being comprised of substantially the same matter as that which comprises the adsorbent phase component in the fused, solid adhesive.

2. A multiple component liquid plastisol/hot melt hybrid adhesive composition comprised of a reinforcing phase component and an adsorbent phase component, both as heterogeneously dispersed particulates within a liquid component, wherein the reinforcing phase component is substantially incompatible with the liquid component, the adsorbent phase component is compatible or substantially more compatible with the liquid component than is the reinforcing phase component, and the reinforcing phase and adsorbent phase components are partially compatible with one another, the composition being chlorine free and having the rheological characteristics of a liquid dispersion at room temperature and being capable of forming a molten blend at elevated temperatures that solidifies into a non-exuding solid adhesive upon cooling, where the reinforcing phase component is comprised of either one or more in combination of a poly(ethylene-co-vinylacetate) copolymer having a VA level of greater than 1% but less than 18%, a poly(ethylene-co-vinyl acetate-co-acrylic acid) terpolymer having a VA level of greater than 1% but less than 18% and an acrylic acid level of less than 8%, a poly(ethylene-co-vinyl acetate-co-methacrylic acid) terpolymer having a VA level of greater than 1% but less than 18% and a methacrylic acid level of less than 8%, a poly(ethylene-co-vinyl acetate-co-maleic anhydride) block or graft terpolymer having a VA level of greater than 1% but less than 18% and a maleic anhydride level of less than 8%, or mixtures thereof.

3. A multiple component liquid plastisol/hot melt hybrid adhesive composition comprised of a reinforcing phase component and an adsorbent phase component, both as heterogeneously dispersed particulates within a liquid component, wherein the reinforcing phase component is substantially incompatible with the liquid component, the adsorbent phase component is compatible or substantially more compatible with the liquid component than is the reinforcing phase component, and the reinforcing phase and adsorbent phase components are partially compatible with one another, the composition being chlorine free and having the rheological characteristics of a liquid dispersion at room temperature and being capable of forming a molten blend at elevated temperatures that solidifies into a non-exuding solid adhesive upon cooling, wherein the reinforcing phase component forms a core of a core-shell particle and is comprised of either one or more in combination of a poly(ethylene-co-vinylacetate) copolymer having a VA level of greater than 1% but less than 50%, a poly(ethylene-co-vinyl acetate-co-acrylic acid) terpolymer having a VA level of greater than 1% but less than 50% and an acrylic acid level of less than 8%, a poly(ethylene-co-vinyl acetate-co-methacrylic acid) terpolymer having a VA level of greater than 1% but less than 50% and a methacrylic acid level of less than 8%, a poly(ethylene-co-vinyl acetate-co-maleic anhydride) block or graft terpolymer having a VA level of greater than 1% but less than 50% and a maleic anhydride level of less than 8%, or mixtures thereof.

4. A multiple component liquid plastisol/hot melt hybrid adhesive composition comprised of a reinforcing phase component and an adsorbent phase component, both as heterogeneously dispersed particulates within a liquid component, wherein the reinforcing phase component is substantially incompatible with the liquid component, the adsorbent phase component is compatible or substantially more compatible with the liquid component than is the reinforcing phase component, and the reinforcing phase and adsorbent phase components are partially compatible with one another, the composition being chlorine free and having the rheological characteristics of a liquid dispersion at room temperature and being capable of forming a molten blend at elevated temperatures that solidifies into a non-exuding solid adhesive upon cooling, where the adsorbent phase component forms a shell of a core-shell particle and is comprised of either one or more in combination of a polypropylene homopolymer, a polypropylene copolymer, a poly(propylene-co-ethylene) copolymer, a poly(propylene-co-maleic anhydride) block or graft copolymer, a polyethylene polymer, stearic acid, palmitic acid, lauric acid, benzoic acid, sebacic acid, dodecanedioic acid, azelaic acid, adipic acid, phthalic acid, a pentaerythritol rosin ester, a terpene resin, a glycerol rosin ester, a polycaprolactone, a hydrocarbon wax, or mixtures thereof.

5. A multiple component liquid plastisol/hot melt hybrid adhesive composition comprised of a reinforcing phase component and an adsorbent phase component, both as heterogeneously dispersed particulates within a liquid component, wherein the reinforcing phase component is substantially incompatible with the liquid component, the adsorbent phase component is compatible or substantially more compatible with the liquid component than is the reinforcing phase component, and the reinforcing phase and adsorbent phase components are partially compatible with one another, the composition being chlorine free and having the rheological characteristics of a liquid dispersion at room temperature and being capable of forming a molten blend at elevated temperatures that solidifies into a non-exuding solid adhesive upon cooling, where the adsorbent phase component is comprised of a compound that imparts release characteristics to a finished article formed from the composition.

6. The adhesive composition of claim 5 where the adsorbent phase component is comprised of N,N'-ethylenebisstearamide.

7. A multiple component liquid plastisol/hot melt hybrid adhesive composition comprised of heterogeneously dispersed particulates within a liquid phase component, where said composition has the rheological characteristics of a liquid dispersion at room temperature, and where said composition can be fused at elevated temperatures to form a molten blend that solidifies into a solid adhesive upon cooling; wherein said adhesive is comprised of a poly(ethylene-co-vinyl acetate) reinforcing phase component; a poly(propylene-co-maleic anhydride) adsorbent phase component; a mineral oil liquid phase component; a thermal stabilizer; and a dicarboxylic acid compound.

8. The adhesive composition of claim 7 where the adsorbent phase is further comprised of polypropylene.

9. The adhesive composition of claim 7, wherein the dicarboxylic acid compound is comprised of sebacic or dodecanedioic acid.

10. The adhesive composition of claim 7, wherein the dicarboxylic acid compound is dispersed or dissolved in the liquid phase of the liquid dispersion.

11. The adhesive composition of claim 7 further comprised of at least partially exfoliated nanoparticles.

12. The adhesive composition of claim 7 further comprised of a chemical foaming agent.

13. The adhesive composition of claim 7 wherein the dispersed particulates are comprised of a mixture of separate and chemically discrete particulate types; where at least one of the particulate types is comprised of substantially the same matter as that which comprises the reinforcing phase component in the fused, solid adhesive; and where at least one of the particulate types is comprised of substantially the same matter as that which comprises the adsorbent phase component in the fused, solid adhesive.

* * * * *